(12) United States Patent
Criswell

(10) Patent No.: US 9,533,841 B1
(45) Date of Patent: Jan. 3, 2017

(54) AUTOMATED TRUCK UNLOADER FOR UNLOADING/UNPACKING PRODUCT FROM TRAILERS AND CONTAINERS

(71) Applicant: Wynright Corporation, Elk Grove, IL (US)

(72) Inventor: Tim Criswell, Arlington, TX (US)

(73) Assignee: Wynright Corporation, Elk Grove, IL (US)

( * ) Notice: Subject to any disclaimer, the term of this patent is extended or adjusted under 35 U.S.C. 154(b) by 0 days.

(21) Appl. No.: 15/256,888

(22) Filed: Sep. 6, 2016

Related U.S. Application Data

(63) Continuation of application No. 14/159,297, filed on Jan. 20, 2014, now Pat. No. 9,434,558.

(60) Provisional application No. 61/754,630, filed on Jan. 20, 2013.

(51) Int. Cl.
| | | |
|---|---|---|
| *G06F 7/00* | (2006.01) | |
| *B65G 67/24* | (2006.01) | |
| *B25J 5/00* | (2006.01) | |
| *B25J 15/06* | (2006.01) | |

(52) U.S. Cl.
CPC ............... *B65G 67/24* (2013.01); *B25J 5/007* (2013.01); *B25J 15/0616* (2013.01)

(58) Field of Classification Search
USPC ........................................................ 700/214
See application file for complete search history.

(56) References Cited

U.S. PATENT DOCUMENTS

| | | | |
|---|---|---|---|
| 3,356,236 A | 12/1967 | Shaw et al. | |
| 3,717,263 A | 2/1973 | McWilliams | |
| 3,756,431 A | 9/1973 | Evans et al. | |
| 3,853,230 A | 12/1974 | Schultz | |
| 3,931,897 A | 1/1976 | Bacon et al. | |
| 3,939,994 A | 2/1976 | Suzzi | |
| 4,585,384 A | 4/1986 | Richard et al. | |
| 4,643,629 A | 2/1987 | Takahashi et al. | |
| 4,680,519 A | 7/1987 | Chand et al. | |
| 5,002,457 A | 3/1991 | Dorner et al. | |
| 5,015,145 A | 5/1991 | Angell et al. | |

(Continued)

OTHER PUBLICATIONS

International Search Report, PCT/US2014/012215, May 14, 2014.

(Continued)

*Primary Examiner* — Kyle Logan
(74) *Attorney, Agent, or Firm* — Scott T. Griggs; Griggs Bergen LLP

(57) ABSTRACT

An automatic truck unloader for unloading/unpacking product, such as boxes or cases, from trailers and containers is disclosed. In one embodiment, a mobile base structure provides a support framework for a drive subassembly, conveyance subassembly, an industrial robot, a distance measurement subassembly, and a control subassembly. Under the operation of the control subassembly, an industrial robot having a suction cup-based gripper arm selectively removes boxes from the trailer and places the boxes on a powered transportation path. The control subassembly coordinates the selective articulated movement of the industrial robot and the activation of the drive subassembly based upon the distance measurement subassembly detecting objects, including boxes, within a detection space, and dimensions of the trailer provided to the control subassembly.

19 Claims, 15 Drawing Sheets

(56) References Cited

U.S. PATENT DOCUMENTS

| | | | |
|---|---|---|---|
| 5,069,592 A | 12/1991 | Galperin | |
| 5,087,169 A | 2/1992 | Tubke | |
| 5,125,298 A | 6/1992 | Smith | |
| 5,219,264 A | 6/1993 | McClure et al. | |
| 5,256,021 A | 10/1993 | Wolf et al. | |
| 5,325,953 A | 7/1994 | Doster et al. | |
| 5,326,218 A | 7/1994 | Fallas | |
| 5,426,921 A | 6/1995 | Beckmann | |
| 5,455,669 A | 10/1995 | Wetteborn | |
| 5,685,416 A | 11/1997 | Bonnet | |
| 5,908,283 A | 6/1999 | Huang et al. | |
| 6,015,174 A | 1/2000 | Raes et al. | |
| 6,115,128 A | 9/2000 | Vann | |
| 6,350,098 B1 | 2/2002 | Christenson et al. | |
| 6,522,951 B2 | 2/2003 | Born et al. | |
| 6,571,532 B1 | 6/2003 | Wiernicki et al. | |
| 6,609,719 B2 | 8/2003 | Heien | |
| 6,612,011 B2 | 9/2003 | Mayr et al. | |
| 6,659,263 B2 | 12/2003 | Hendrickson et al. | |
| 6,662,931 B2 | 12/2003 | Bruun et al. | |
| 6,699,007 B2 | 3/2004 | Huang et al. | |
| 6,869,267 B2 | 3/2005 | Pfeiffer et al. | |
| 6,874,615 B2 | 4/2005 | Fallas | |
| 6,896,474 B2 | 5/2005 | Guidetti | |
| 7,047,710 B2 | 5/2006 | Winkler | |
| 7,967,543 B2 * | 6/2011 | Criswell | B65G 67/08 414/341 |
| 8,562,277 B2 | 10/2013 | Criswell | |
| 9,434,558 B2 | 9/2016 | Criswell | |
| 2004/0069854 A1 | 4/2004 | Good et al. | |
| 2005/0047895 A1 | 3/2005 | Lert | |
| 2005/0105990 A1 | 5/2005 | Maclay | |
| 2005/0135912 A1 | 6/2005 | Schempf et al. | |
| 2005/0278193 A1 | 12/2005 | Kibbler | |
| 2008/0267756 A1 | 10/2008 | Echelmeyer et al. | |
| 2009/0110522 A1 * | 4/2009 | Criswell | B65G 67/08 414/398 |
| 2009/0110525 A1 * | 4/2009 | Criswell | B65G 67/08 414/507 |
| 2009/0306812 A1 * | 12/2009 | Cottone | B65G 57/03 700/217 |
| 2010/0239408 A1 | 9/2010 | Becker et al. | |
| 2011/0139576 A1 | 6/2011 | Johannsen | |
| 2012/0177467 A1 | 7/2012 | Corrigan et al. | |
| 2013/0272828 A1 | 10/2013 | Andre et al. | |

OTHER PUBLICATIONS

Wynright. Robotics Solutions. Robotic Truck Unloader (RTU). Feb. 28, 2012 (retrieved on Apr. 28, 2014). Retrieved from the internet: <URL: http://www.roboticsbusinessreview.com/images/gc/wynright_rtu.pdf>.

* cited by examiner

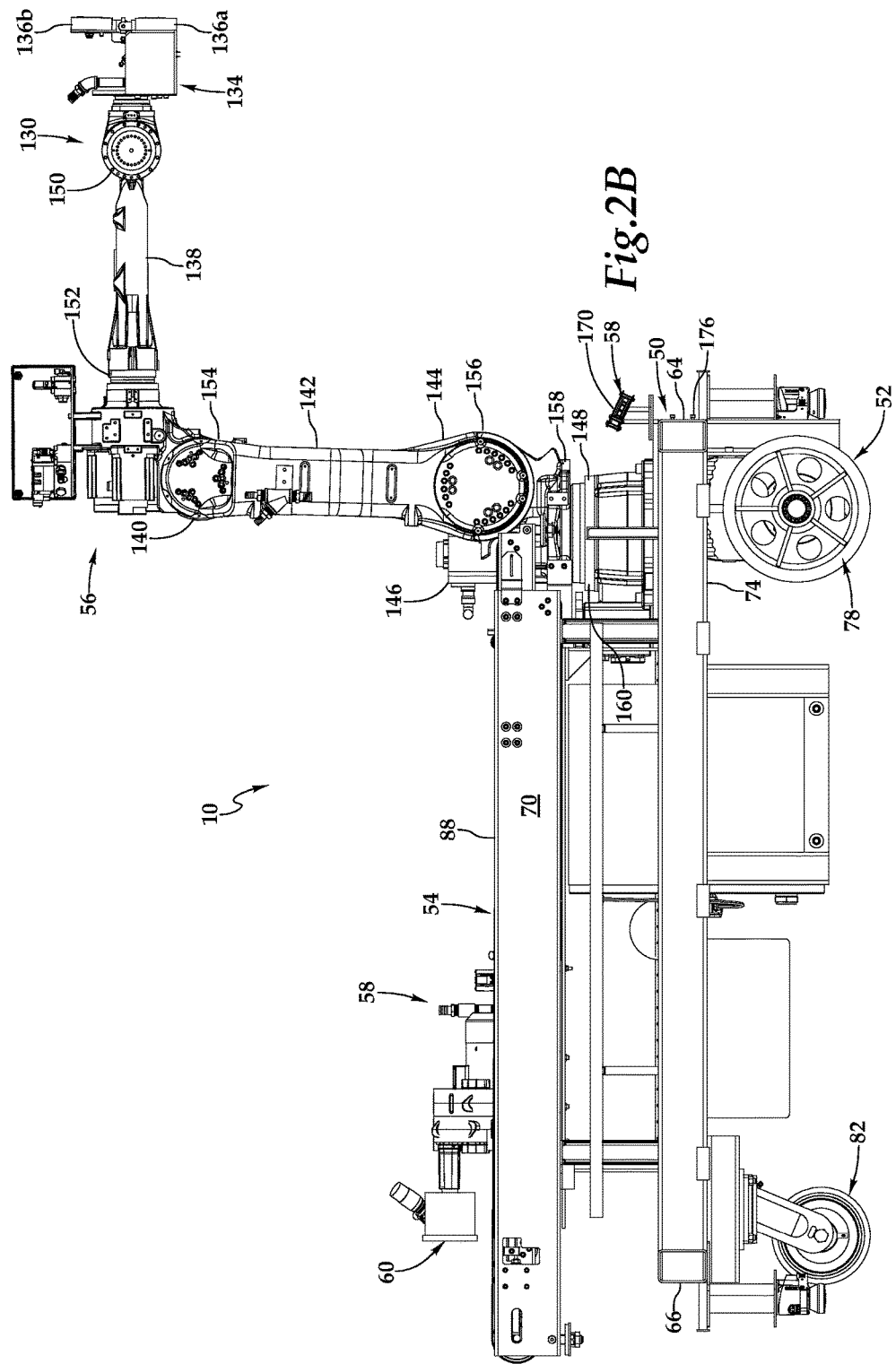

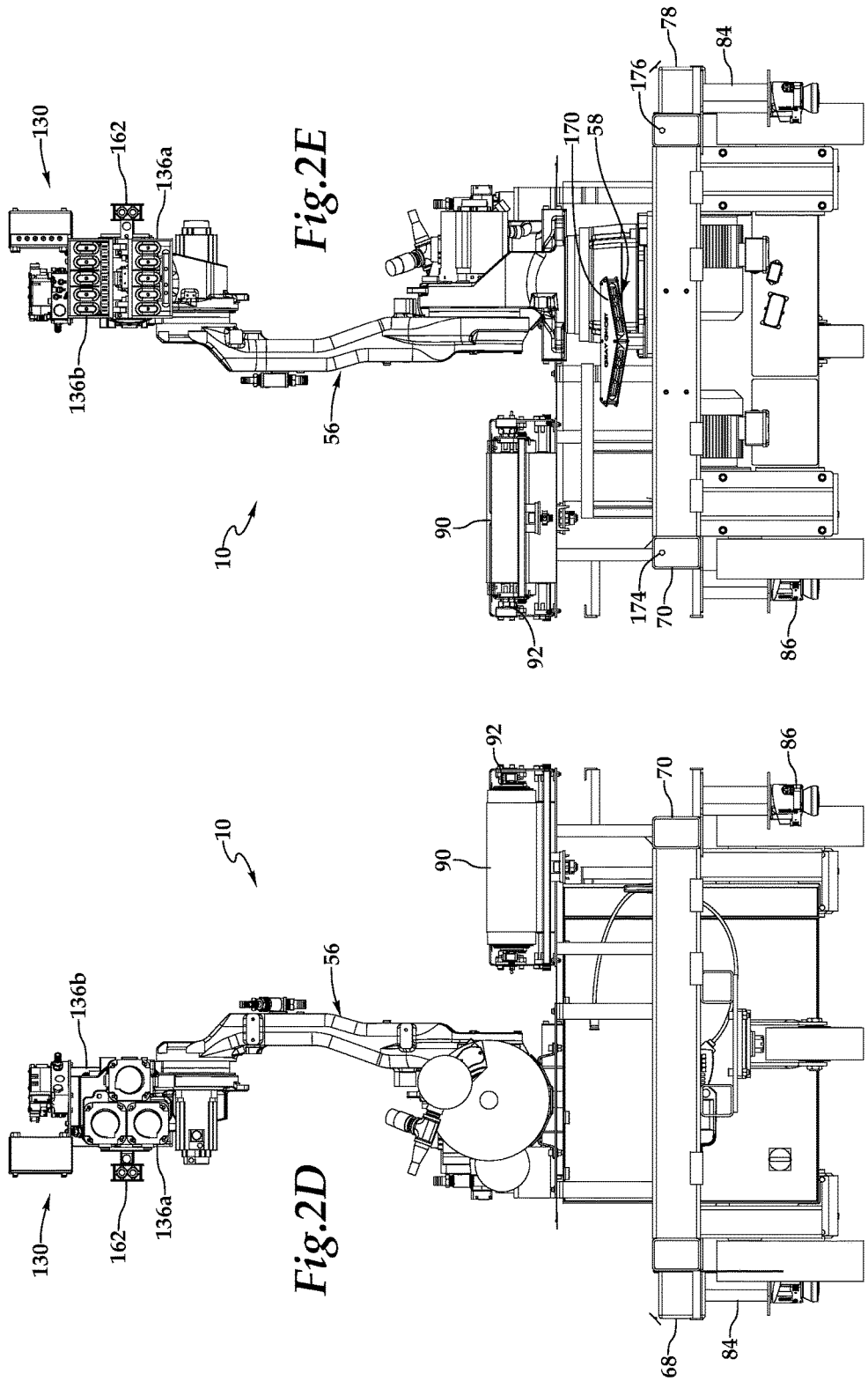

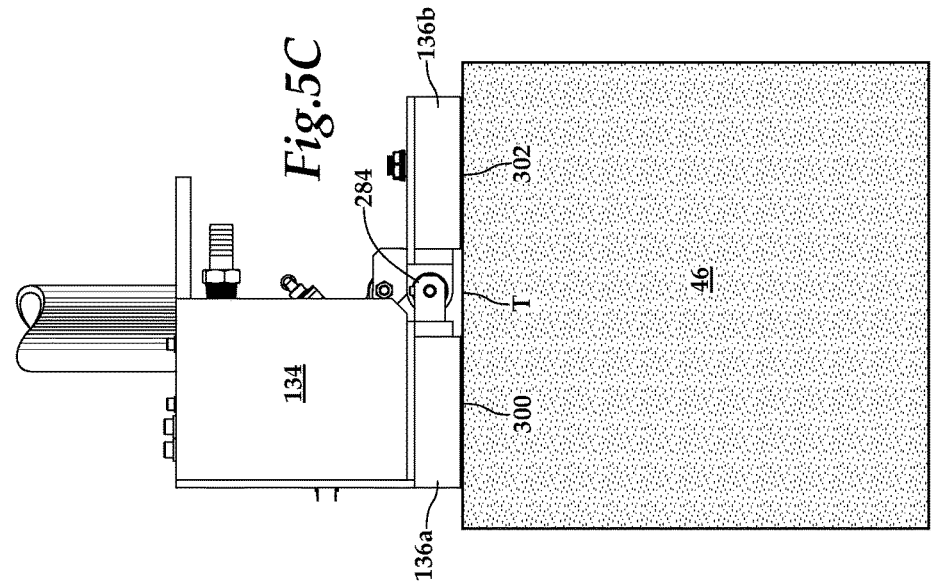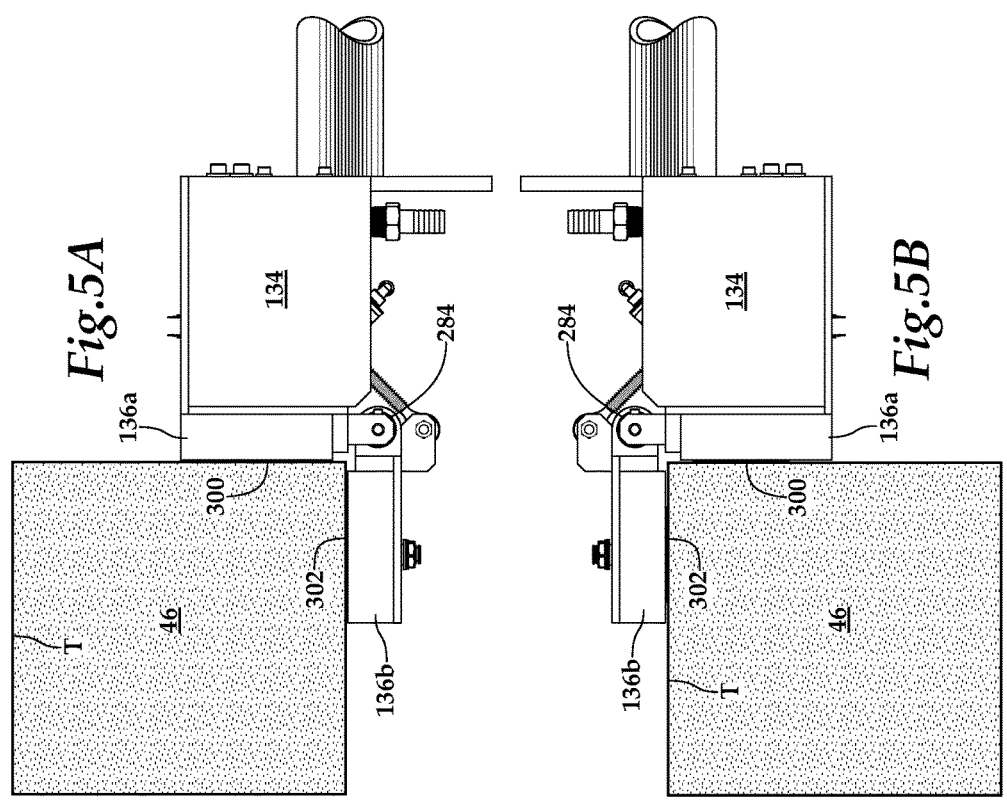

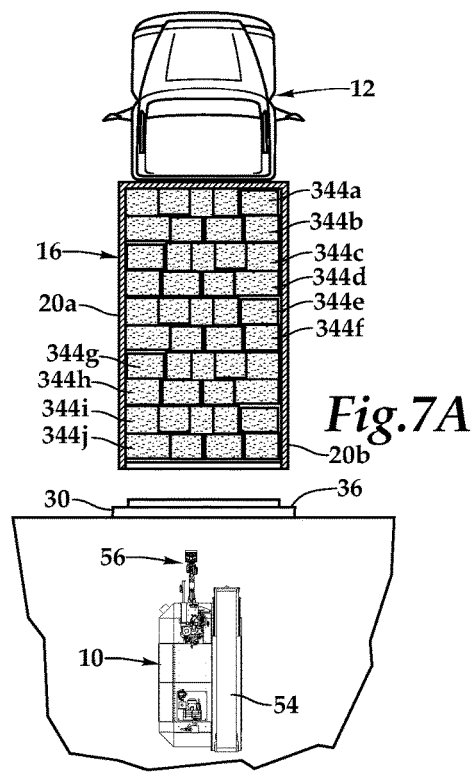
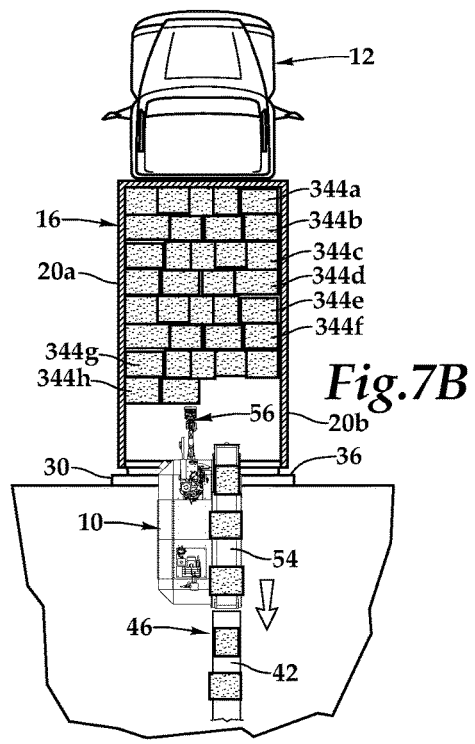
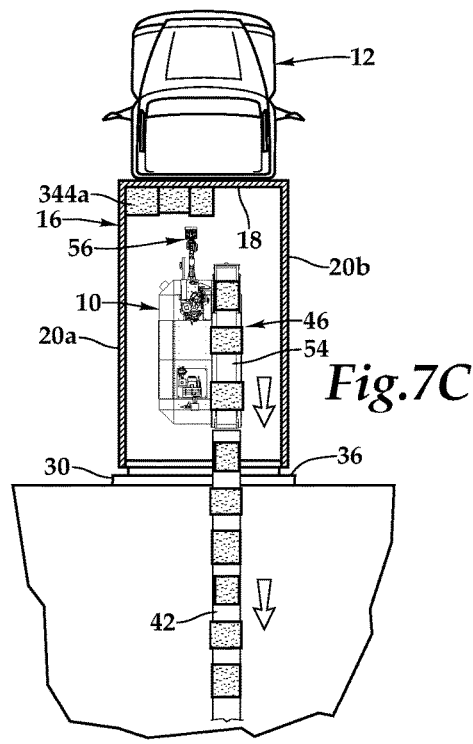
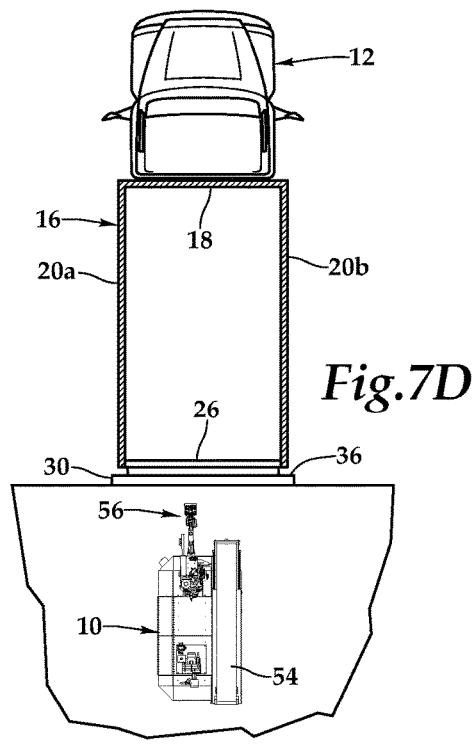

AUTOMATED TRUCK UNLOADER FOR UNLOADING/UNPACKING PRODUCT FROM TRAILERS AND CONTAINERS

PRIORITY STATEMENT & CROSS-REFERENCE TO RELATED APPLICATIONS

This application is a continuation of U.S. patent application Ser. No. 14/159,297 entitled "Automated Truck Unloader for Unloading/Unpacking Product from Trailers and Containers" and filed on Jan. 20, 2014, in the name of Tim Criswell, now U.S. Pat. No. 9,434,558 issued on Sep. 6, 2016; which claims priority from U.S. Patent Application No. 61/754,630, entitled "Automated Truck Unloader for Unloading/Unpacking Product from Trailers and Containers" and filed on Jan. 20, 2013, in the name of Tim Criswell, all of which are hereby incorporated by reference for all purposes.

TECHNICAL FIELD OF THE INVENTION

This invention relates, in general, to a machine for handling products and, more particularly, to a system and method for automated unloading and unpacking which employ an automatic truck unloader designed to unload and unpack product, such as boxes or cases, from trailers and containers.

BACKGROUND OF THE INVENTION

Loading docks and loading bays are commonly found in large commercial and industrial buildings and provide arrival and departure points for large shipments brought to or taken away by trucks and vans. By way of example, a truck may back into a loading bay such that the bumpers of the loading bay contact the bumpers on the trailer and a gap is created between the loading bay and the truck. A dock leveler or dock plate bridges the gap between the truck and a warehouse to provide a fixed and substantially level surface. Power moving equipment, such as forklifts or conveyor belts, is then utilized to transport the cargo from the warehouse to the truck. Human labor is then employed to stack the cargo in the truck. This is particularly true of the unloading of product, such as boxes or cases, from a truck, or freight container, for example. These systems are designed to maximize the amount the cargo unloaded while minimizing the use of human labor to both protect and extend the life of the workforce. Reducing human labor, however, has proven difficult as the configuration and size of the boxes in the truck or freight container cannot be easily predicted in advance. Therefore, a need still exists for improved truck unloading systems that further reduce the use of human labor when unloading or unpacking product, such as cases and boxes, from trailers and containers.

SUMMARY OF THE INVENTION

It would be advantageous to achieve a system and method for automated unloading and unpacking of product, such as cases and boxes, that would enable a trailer or container to be fully unloaded using minimal or no human labor, thereby minimizing the time to unload the truck and the need for human capital. It would also be desirable to enable a robotic solution that would address this problem by unloading and unstacking trailers and containers with boxes and cases of varying sizes. To better address one or more of these concerns, in one embodiment, an automatic truck unloader for unloading/unpacking product, such as boxes or cases, from trailers and containers is disclosed. A mobile base structure provides a support framework for a drive subassembly, conveyance subassembly, an industrial robot, a distance measurement subassembly such as a camera utilizing an adaptive depth principle, and a control subassembly. Under the operation of the control subassembly, an industrial robot having a suction cup-based gripper arm selectively removes boxes from the trailer and places the boxes on a powered transportation path. The control subassembly coordinates the selective articulated movement of the industrial robot and the activation of the drive subassembly based upon the distance measurement subassembly detecting objects, including boxes, within a detection space, and dimensions of the trailer provided to the control subassembly. These systems and methodologies utilizing the present automatic truck unloader therefore maximize the amount the product and cargo unloaded while minimizing the use of human labor to both protect and extend the life of the workforce. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 2B is a side elevation view of the automatic truck unloader illustrated in FIG. 1;

FIG. 2D is a rear elevation view of the automatic truck unloader illustrated in FIG. 1;

FIG. 2E is a front elevation view of the automatic truck unloader illustrated in FIG. 1;

FIG. 5A is a side elevation view of one embodiment of an end effector gripping a box in a first gripping position;

FIG. 5B is a side elevation view of the end effector in FIG. 5A gripping a box in a second gripping position;

FIG. 5C is a side elevation view of the end effector in FIG. 5A gripping a box in third gripping position;

FIGS. 7A through 7D are top plan views of an operational embodiment corresponding to the operation shown in FIGS. 6A through 6D;

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
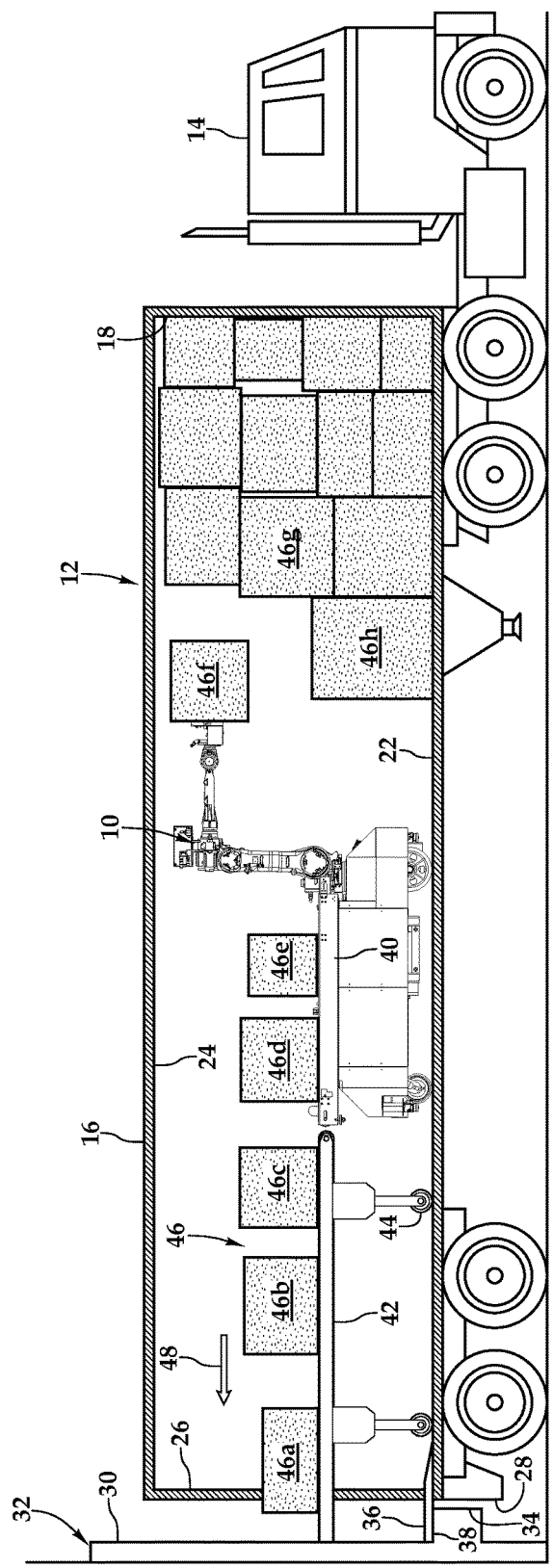
FIG. 1 is a side elevational view with partial cross-section of one embodiment of an automatic truck unloader positioning product within a trailer of a truck.

Referring initially to FIG. 1, therein is depicted an automatic truck unloader that is schematically illustrated and generally designated 10 and may be referred to as the automatic truck unloader. This automatic truck unloader 10 is utilized in systems and methods for automated truck unloading and packing of trailers, containers and the like. A tractor trailer 12 having an operator cab 14 is towing a trailer 16 having a front wall 18, two side walls 20A, 20B (best seen in FIGS. 6A through 6D, for example), a floor 22, a ceiling 24, and a rear access opening 26 accessible due to an open door. A bumper 28 of the trailer 16 is backed up to a loading bay of loading dock 32 such that the bumper 28 touches a bumper 34 of the loading bay 30. A dock plate 36 bridges the gap between the floor 22 and a deck 38 of the loading dock 32.

As will be described in further detail hereinbelow, under the supervision of distance measurement subassembly or subassemblies that are components of the automatic truck unloader 10, the automatic truck unloader 10 maneuvers and drives automatically into the trailer 16 to a position as proximate as possible to the front wall 18. It should be appreciated that although an operator is not depicted as operating the automatic truck unloader 10, an operator may be at location 40, an operator platform, although unnecessary. The automatic truck unloader 10 operates independently of an operator and an operator is only necessary for certain types of troubleshooting, maintenance, and the like. A telescoping conveyor unit 42 is connected to the automatic truck unloader 10. A stream of product 46, in the form standard cases or boxes 46A-46H, which may be of any dimension, is being supplied by the automatic truck unloader upon removal thereof, as shown by arrow 48. In particular, the automatic truck unloader 10 has already unloaded boces 46A through 46E, and others, for example, at the intersection of the product 46 proximate the front wall 18 and the floor 22. As shown, the automatic truck unloader 10 is unloading box 46f, which will be followed by boxes 46g, 46h and other boxes 46. The automatic truck unloader 10 alternates between unloading the product 46 and driving forward to create more opportunities to grip the product 46 between the front wall 18 and the automatic truck unloader 10 until the trailer 16 is at least partially unloaded of product 46.

FIG. 2A through FIG. 2G and FIG. 3A through FIG. 3B depict the automatic truck unloader 10 in further detail. A mobile base 50 supports a drive subassembly 52, a conveyance subassembly 54, an industrial robot 56, a positioning subassembly 58, a safety subsystem 60, and a control subassembly 62, which interconnects the drive subassembly 52, conveyance subassembly 54, industrial robot 56, positioning subassembly 58, and safety subsystem 60. The mobile base 50 includes a front end 64 and a rear end as well as sides 68, 70, a surface 72, and an undercarriage 74.

The drive subassembly 52 is coupled to the undercarriage 74 of the mobile base 50 to provide mobility. As will be discussed in further detail hereinbelow, drive wheel assemblies 78, 80, are disposed on the undercarriage 74 proximate to the sides 70, 68 respectively. A universal wheel assembly 82 is disposed on the undercarriage 74 more proximate to the rear end 66 and centered between the sides 68, 70, respectively. In combination, wheel assemblies 78, 80, 82 provide forward and reverse drive and steering. Retractable stabilization assemblies 84, 86 are also disposed on the undercarriage 74 proximate to the intersection of the end 64 and side 68, the intersection of end 66 and the side 70, respectively. As alluded to, in a forward or reverse drive and steering operation, such as moving into or out of the trailer 16, drive wheel assemblies 78, 80 and the universal wheel assembly 82 are actuated and in contact with the deck 38 of the loading dock 32 while the retractable stabilization assemblies 84, are withdrawn from contact with the deck 38 in a position close to the undercarriage 74. On the other hand, when the automatic truck unloader 10 is conducting a product loading or unloading operation, such as during the use of the industrial robot 56, the retractable stabilization assemblies 84, 86 are positioned in contact with the deck 38 to anchor the automatic truck unloader 10. It should be appreciated that although the automatic truck unloader 10 is being described relative to unloading and unpacking, the automatic truck unloader 10 may also be used to load and pack product, including boxes and cases, into a trailer.

The conveyance subassembly 54 is disposed on the surface 72 of the mobile base 50 to provide a powered transportation path 88 operable for measuring, separating, carrying, and stacking, as required by the application and job assignment of the automatic truck unloader 10, boxes from the rear end 66 to the front end 64 proximate to the industrial robot 56. As shown, the powered transportation path 88 includes a powered roller conveyor 90 having roller elements 92 which deliver the boxes 46 to a landing platform 94 where manipulation by the industrial robot 56 is initiated. It should be appreciated that although only a single powered roller conveyor 90 is display, the powered transportation path 88 may include any combination and type of conveyors, elevators, stackers, and bypasses and the particular combination of components selected for the powered transportation path 84 will depend upon the particular boxes or other product and application of the automatic truck unloader 10.

The conveyance subassembly 54 as well as the telescoping conveyor unit 42 may also each be equipped with a series of end stop photo eyes to adjust the rate of automatic flow of product through the telescoping conveyor unit 42 and the conveyance subassembly 54. Such an implementation provides a steady and continuous flow of product, maintains proper box or product separation, and prevents unnecessary gaps between the product and product backups and jams.

A telescoping conveyor interface 104 couples the roller conveyor 90 of the conveyance subassembly 54 to the telescoping conveyor unit 42 and the rest of a pick belt system which may be at the warehouse associated with the loading dock 32. Auto-follow circuitry associated with the telescoping interface 104 of the telescoping conveyor unit and the conveyance subassembly 54 may utilize fiber optic sensors at the last boom of the telescoping conveyor unit 42 detect reflective tape at the edge of the conveyance subassembly to cause the telescoping conveyor unit 42 to extend and retract to maintain the proper position with respect to the automatic truck unloader 10. In another embodiment, the telescoping conveyor unit 42 may be passive and the automatic truck unloader 10 may provide the force to extend or retract the telescoping conveyor unit 42.

The industrial robot 56 is disposed at the front end 64 and adapted to provide selective articulated movement of an end effector 130 between the landing platform 94 of the powered transportation path 88 and a reachable space 132 such that the industrial robot 56 is operable to place the product 46 in the reachable space 132. The end effector 130 includes a gripper arm 134 adapted for manipulating product with cooperating and complementary grapplers 136A, 136B. It should be appreciated that any type of end effector 130 may be employed the industrial robot and the choice of end effector 130 will depend upon the product 46 and specific automatic truck unloader 10 application. By way of example, the gripper arm 134 with grapplers 136A, 138B is preferred for unloading and unpacking boxes 46A-46H. It should be understood, however, that the product 46 may be any type of good such as other cased or non-cased objects requiring loading.

Figure 2A:
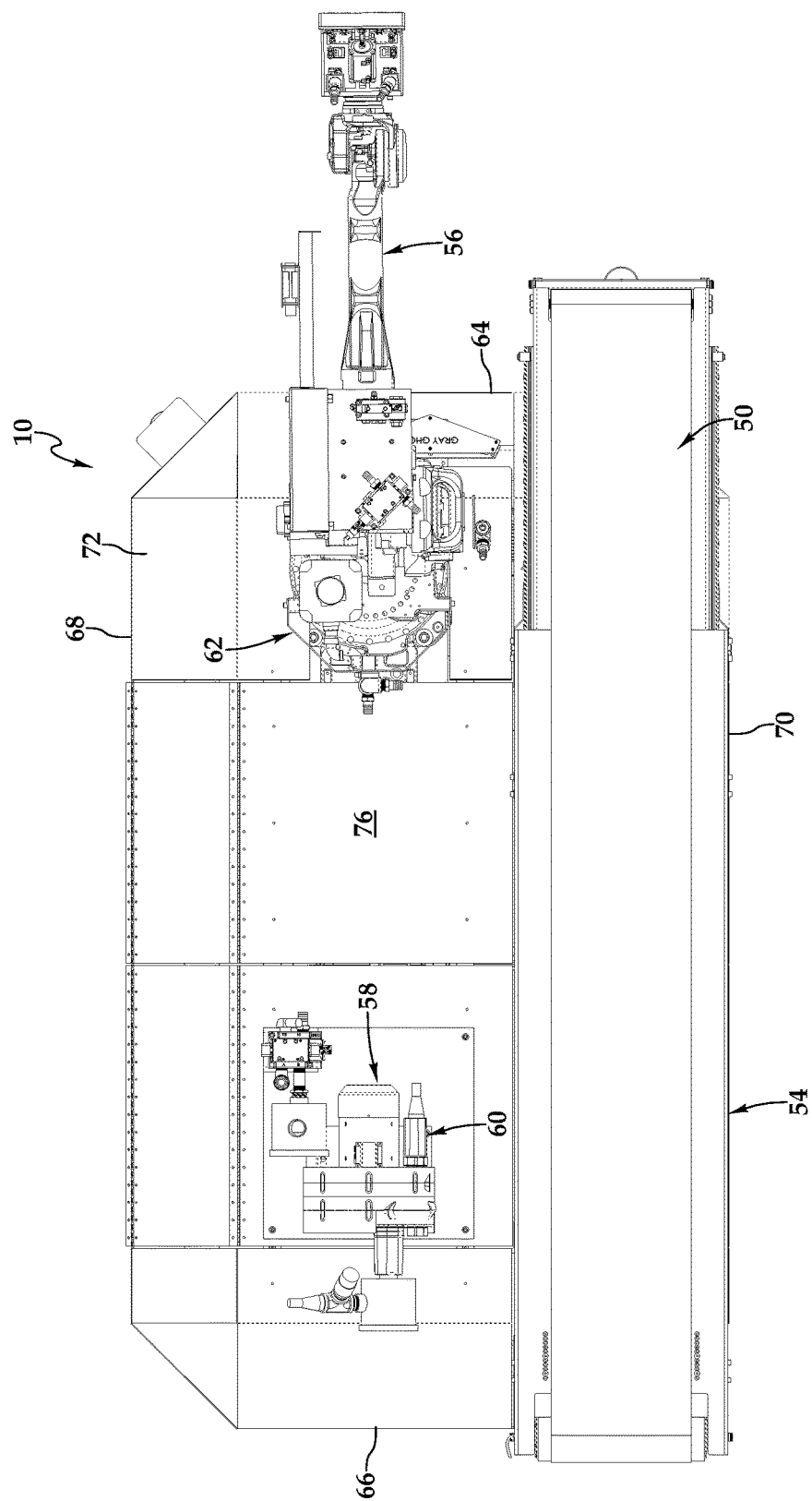
FIG. 2A is a top plan view of the automatic truck unloader illustrated in FIG. 1.
Figure 2C:
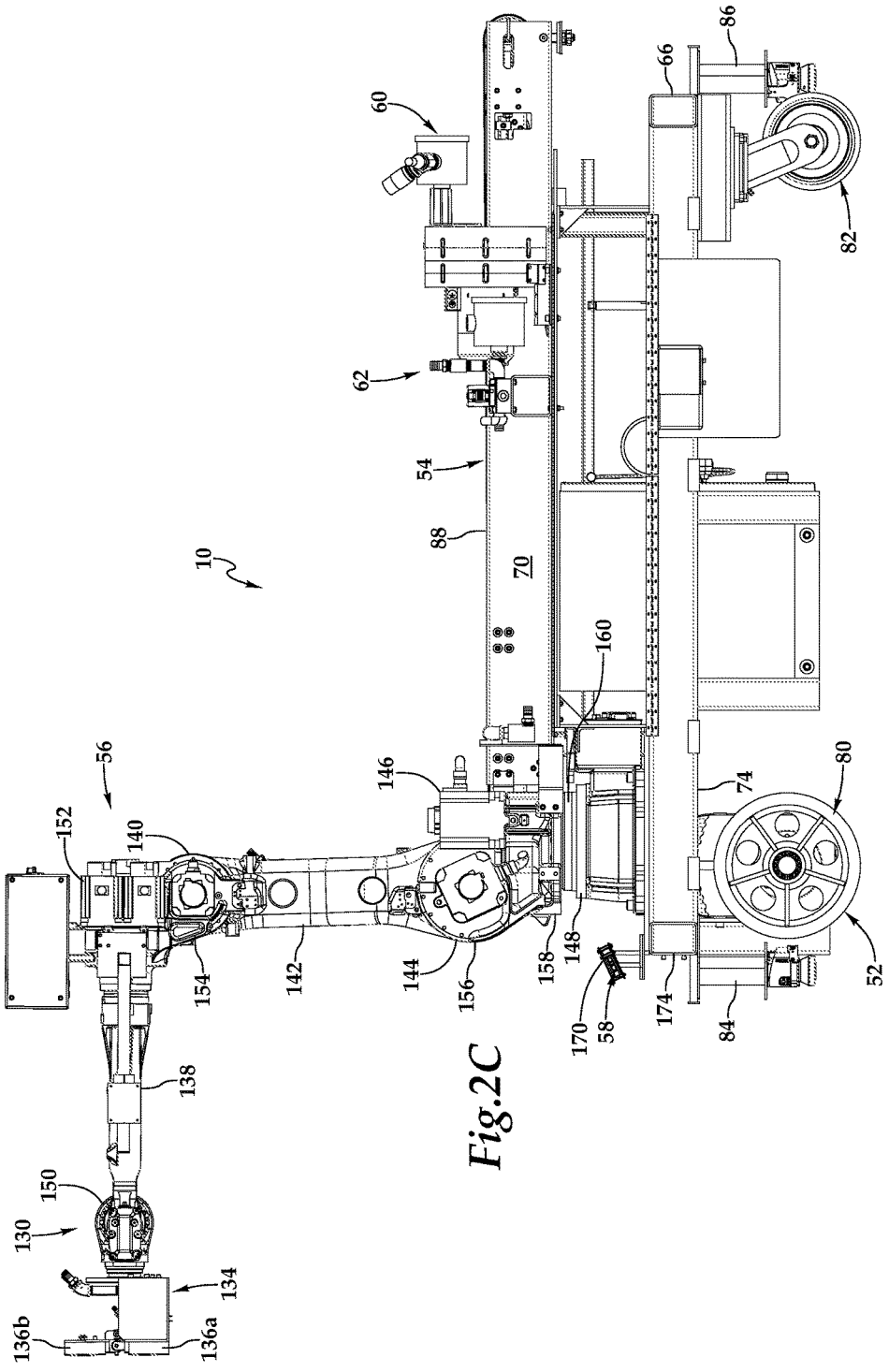
FIG. 2C is a second side elevation view of the automatic truck unloader illustrated in FIG. 1.
Figure 2F:
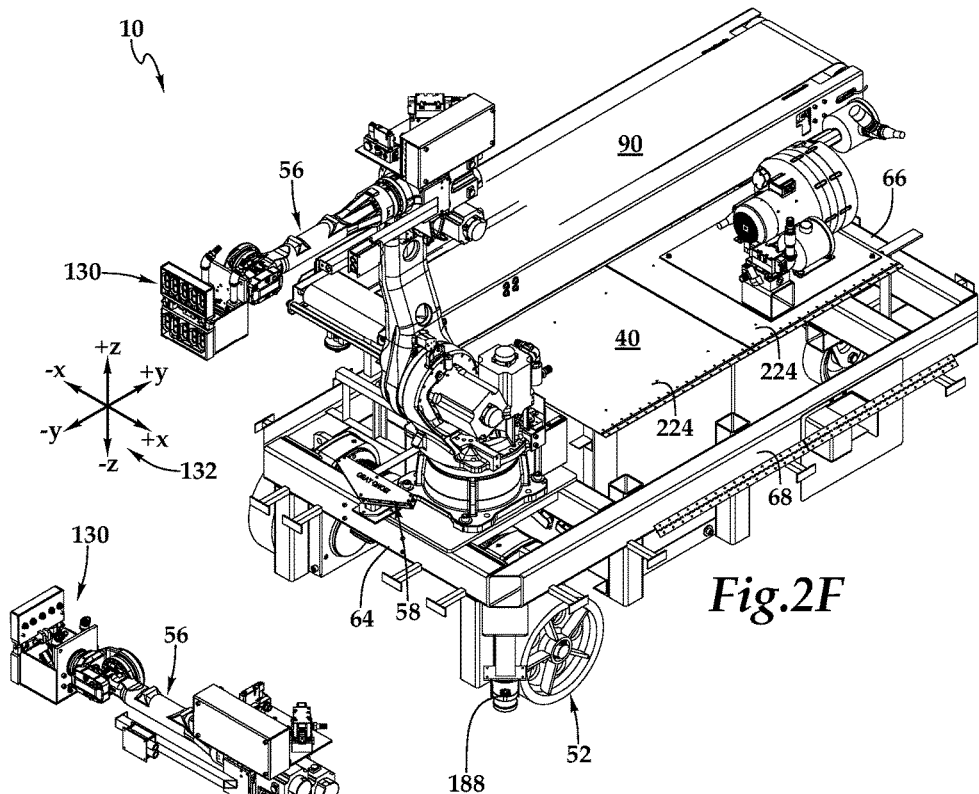
FIG. 2F is a front perspective view of the automatic truck unloader illustrated in FIG. 1.
Figure 2G:
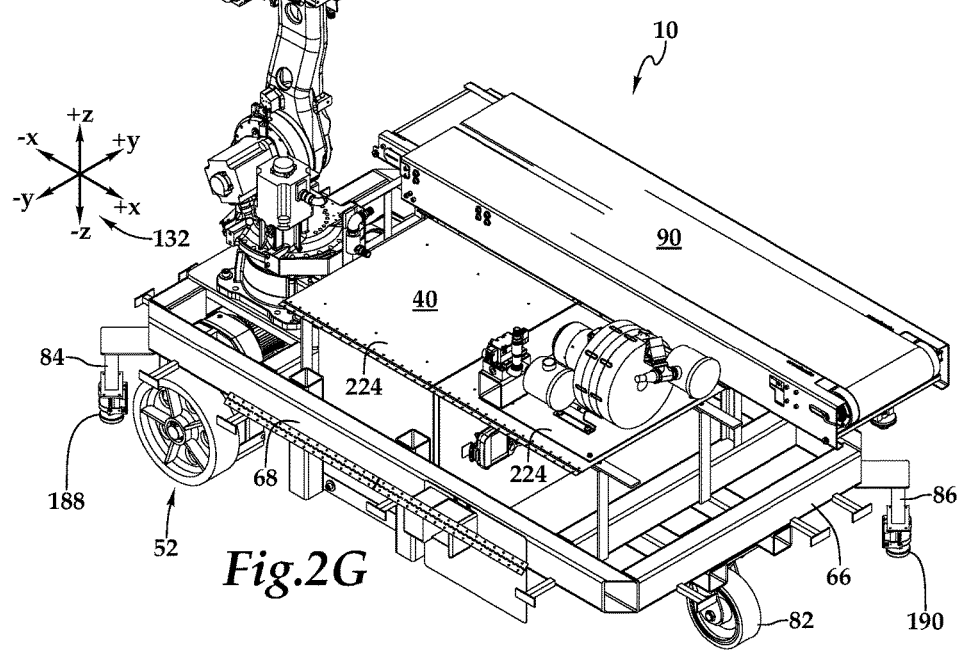
FIG. 2G is a rear perspective view of the automatic truck unloader illustrated in FIG. 1.
Figure 3A:
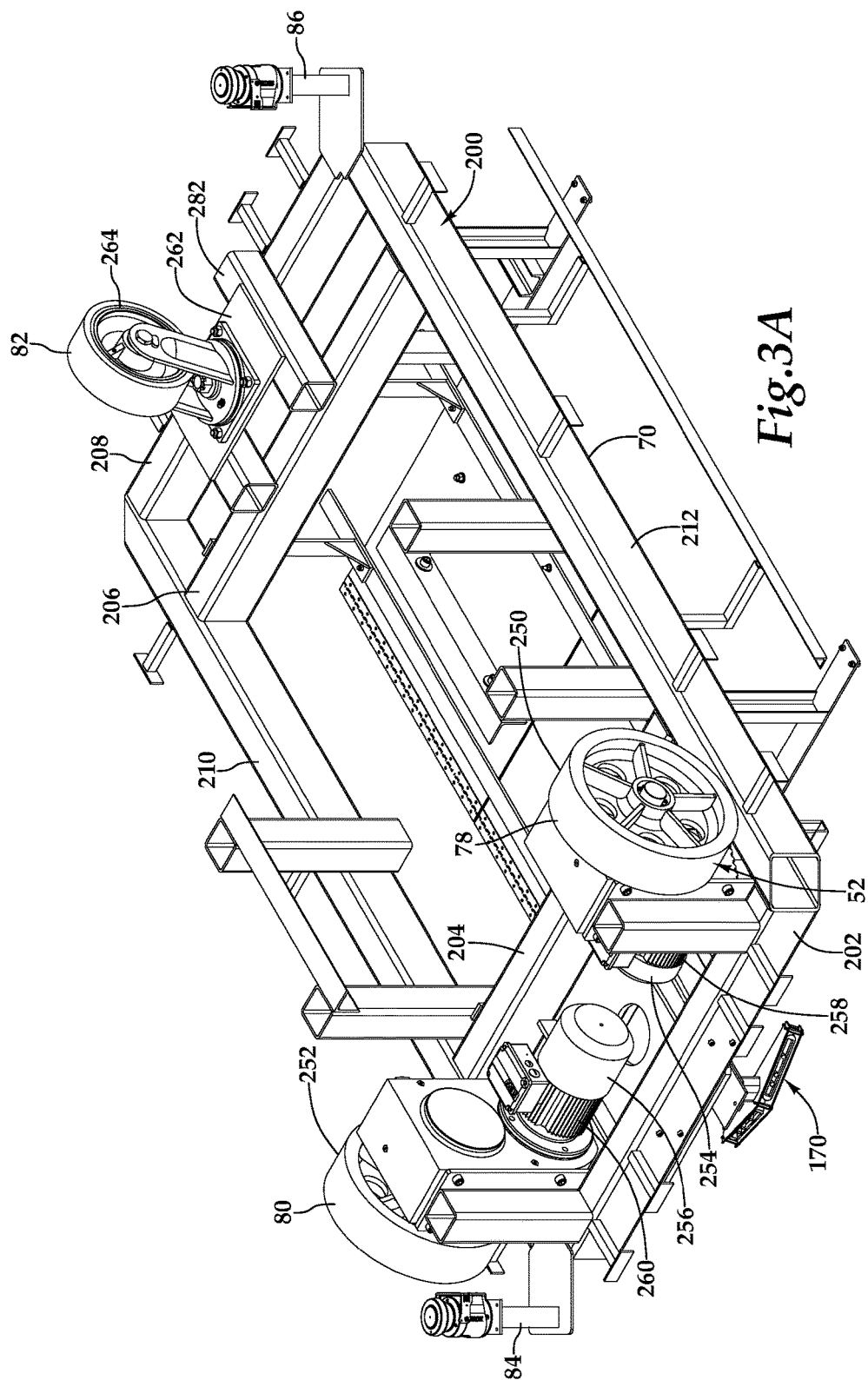
FIG. 3A is a perspective view of a portion of the automatic truck loader of FIG. 1 and in particular a detailed view of one embodiment of a mobile base.
Figure 3B:
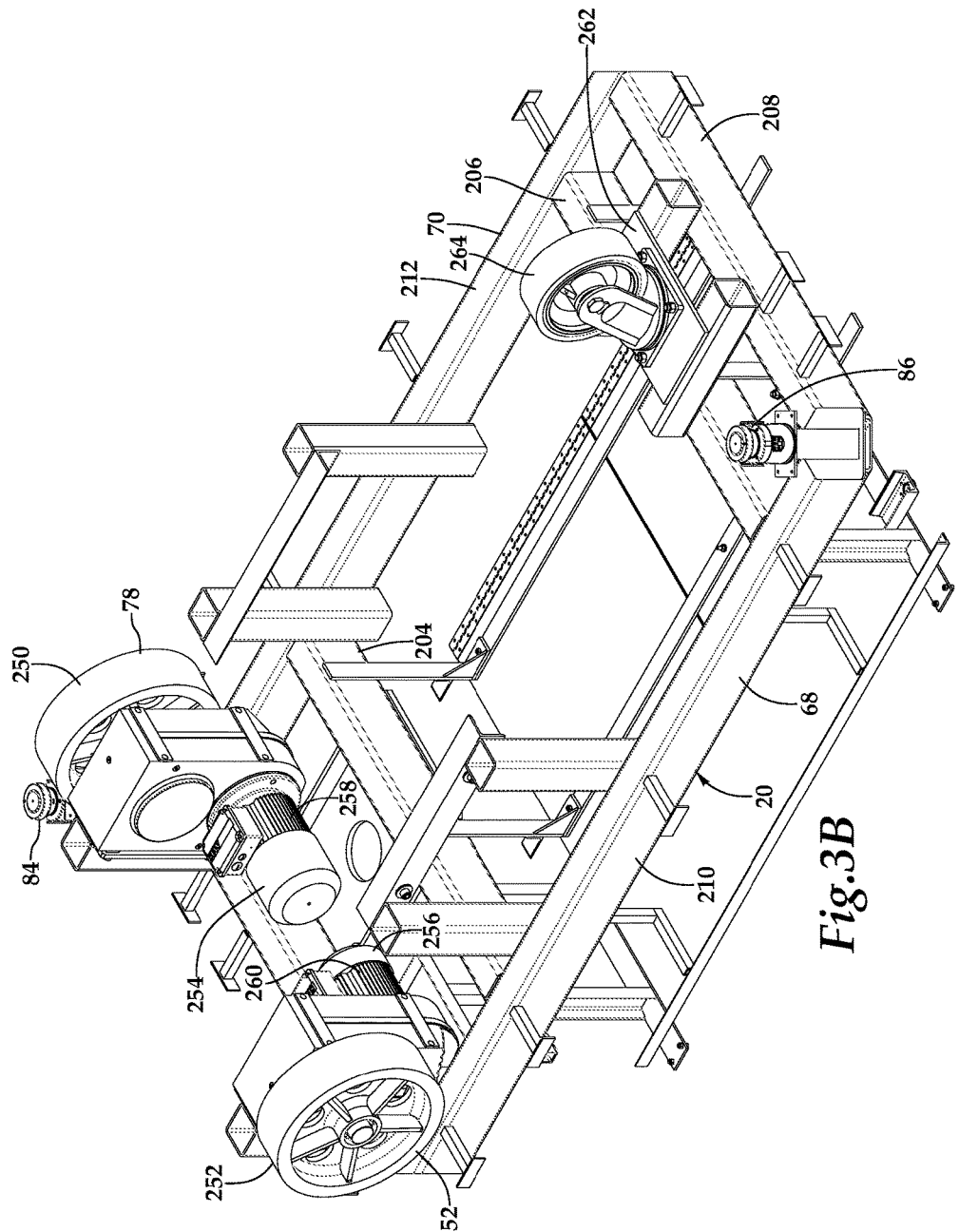
FIG. 3B is a second perspective view of the mobile base illustrated in FIG. 3A.
Figure 4A:
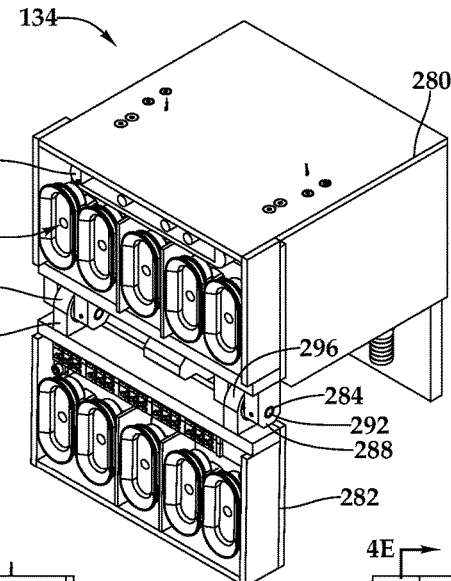
FIG. 4A is a front perspective view of one embodiment of an end effector, which forms a portion of the automatic truck unloader.
Figure 4B:
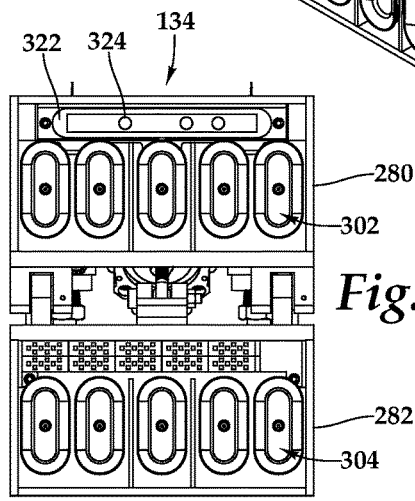
FIG. 4B is a front elevation view of the end effector in FIG. 4A.
Figure 4C:
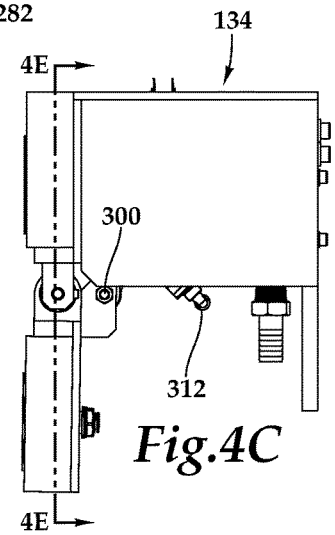
FIG. 4C is a side elevation view of the end effector in FIG. 4A.
Figure 4D:
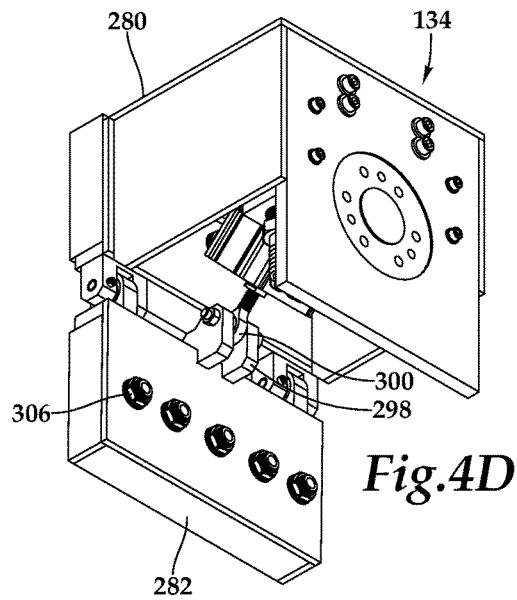
FIG. 4D is a rear perspective of the end effector in FIG. 4A.
Figure 4E:
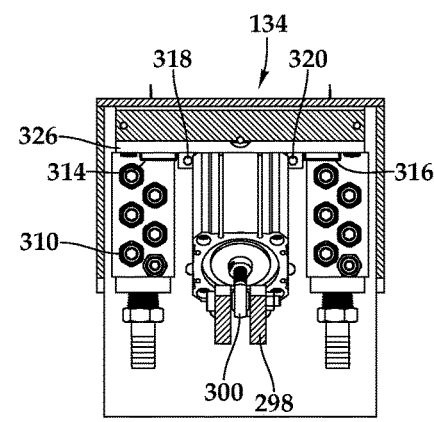
FIG. 4E is a cross-section view of the end effector along line 4E-4E of FIG. 4C.

In one implementation, the industrial robot 56 includes seven segments 130, 138, 140, 142, 144, 146, 148 joined by six joints 150, 152, 154, 156, 158, 160 to furnish selective articulated movement having six degrees of freedom. More particularly, the referenced reachable space 132, as best seen in FIGS. 2F and 2G, is defined by the movement of the industrial robot 56 which provides rotation about six axes including rotary movement of the entire industrial robot 56 about a primary vertical axis; rotary movement of segment 146 having a tower structure about horizontal axis to provide extension and retraction of the segment 144 having a boom arm; rotary movement of the boom arm about the horizontal axis to provide raising and lowering of the boom arm; and selective rotary movement about three wrist axes.

The positioning subassembly 58 is dispersed throughout the mobile base 50. A distance measurement subassembly 170 disposed at the front end 64 of the mobile base 50 measures distance and determines the presence of objects within a detection space 172 which is located in front of the front end 64. In one embodiment, the detection space 172 and the reachable space 132 at least partially overlap. The distance measurement subassembly 170 assists the automatic truck unloader 10 with forward and reverse movement and the repositioning of the automatic case loader 10 to create additional empty reachable space 132 for the placement of the product 46. Further, the distance measurement subassembly 170 assists with the coordination and operation of the industrial robot 56. Distance and measurement information gathered by the distance measurement subassembly 170 is provided to the control subassembly 62.

As will be discussed in further detail hereinbelow, the distance measurement subassembly 170 may be a laser range finding apparatus operating on a time-of-flight measurement basis or principle or a camera system operating on an adaptive depth principle. It should be appreciated, however, that other types of distance measurements are within the teachings of the present invention. By way of example, and not by way of limitation, the distance measurement subassembly may include a laser range finding apparatuses, cameras, ultrasonic measurement apparatuses, inclinometers, and combinations thereof. Similar to distance measurement subassembly 170, distance measurement subassemblies 174, 176 are respectively disposed at the sides 68, 70. The distance measurement subassemblies 174, 176 each may include in one embodiment, detection spaces (not illustrated) to provide measurement and distance information to the control subassembly 62 during traverse movement operations of the automatic truck unloader 10.

The safety subsystem 60 is distributed and mounted to the mobile base 50. The safety subsystem 60 may include a light tower which provides a quick indication of the current status of the automatic truck unloader 10 to an operator and a wireless operator alert system 182 which contacts pagers or cellular devices of individuals through a wireless network. Also a cage and railing may be included around the operator platform 40 to provide additional safety to the operator. Emergency buttons may be located throughout the automatic truck unloader 10 to provide for instant and immediate power down. Front safety scanners 188 and rear safety scanners 190 may be positioned at the front end 64 and the rear end 64 to protect the automatic truck unloader 10, people, and product during a collision with an obstacle. Additionally, the front safety bumpers 188 and the rear safety bumpers 190 may include detectors that detect the presence of an object and cause an automatic power down during a collision. Side safety scanners, although not illustrated, may also be utilized. It should be appreciated that other safety features, such as safety bumpers, may be integrated into the automatic truck unloader 10.

The control subassembly 62, which is also distributed and mounted to the mobile base 50, may include control station having a user interface disposed at the side 70 near the operator platform 76. As discussed, the drive subassembly 52, the conveyance subassembly 54, the industrial robot 56, the positioning subassembly 58, and the safety subassembly 60 are interconnected and in communication with the control subassembly 62 via a network of concealed and sheathed cables and wires. With this arrangement, the control subassembly 62 may coordinate the manual and automatic operation of the automatic truck unloader 10. Further, a visual detection subsystem 162 is associated with the end effector such that the visual detection subsystem 162 captures an image of a product space for processing by the control subassembly, as will be discussed further hereinbelow.

A main frame 200 is constructed of welded steel tubing includes tubular sections 202, 204, 206, and 208 which provide a rectangular framework. The tubular sections 202-208 are supported by tubular sections 208, 210, 214, 216, 218, and 220, which augment and further support the rectangular framework. All mounting plates, such as mounting plates 222, 224 and bolt holes necessary to hold the various components attached to the mobile base are included in the main frame 200. The large plates 222, 224 hold, for example, the control station and the user interface in position while providing counter weight for the automatic truck unloader 10 as well as balance with respect to the industrial robot 56 disposed proximate to the mounting plates 222, 224. Additional counter weight may be supplied by tractor weights mounted proximate to the rear end 66, which also serve to add additional support and integrity to the main frame 200.

Drive wheel assemblies 78, 80 include a pair of front drive wheels 252, 250 disposed proximate to the front end 64 and, more particularly, proximate the intersection of tubular sections 208, 214 and tubular sections 204, 214, respectively. Respective AC motors 254, 256 with double reduction gearboxes 258, 260 supply power thereto. The AC motor 254 with double reduction gearbox 258 is disposed adjacent to the tubular section 214 and the front drive wheel 250. Similarly, the AC motor 256 with double reduction gearbox 260 is disposed adjacent to the tubular section 214 and the front drive wheel 252. The universal wheel assembly 82 includes a rear steering wheel 284 mounted to a frame 286 disposed proximate to the rear end 66.

With reference to the operation of the drive subassembly 52 in conjunction with the mobile base 50, the drive wheel assemblies 78, 80 and universal wheel assembly 82 provide mobility along the length of the automatic truck unloader 10. The AC motors 254, 256 with the respective double reduction gearboxes 258, 260 drive the front drive wheels 250, 252. In particular, each front drive wheel 250, 252 is independently driven to provide the ability to turn and to provide a pivoting drive mode. The universal wheel assembly 82 provides a rear steering wheel 284 to provide enhanced steering capability for the automatic truck unloader 10. In addition to providing forward and reverse capability, the one embodiment, the drive subassembly 52 may furnish a traverse drive system providing the capability to move the entire automatic truck unloader 10 perpendicular to a trailer or fixed object at the loading dock 32.

Referring now to FIGS. 4A through 4E, wherein a gripper arm 134 of the end effector 130 having grippers 136A, 136B is depicted. More particularly, the gripper arm 134 includes a main frame 280 having a support frame 281 for attachment to the industrial robot 56. A moving frame half 282 is selectively pivotally coupled to the main frame 280 by a joint 284 to provide a range of motion between approximately a parallel presentation between the main frame 280 and the moving frame 282 and approximately an orthogonal presentation between the main frame 280 and the moving frame 282. The joint 284 comprises hinge pairs 286, 288 secured by hinge pins 290, 292. Self aligning ball bearings 294, 296 are respectively located at each of the hinge pairs 286, 288 to provide for improved engagement between the main frame 280, moving frame half 282 and the surface of a product, such as a case or box. A shoulder fastener 298 and ball joint end rod 300, which also couple the main frame 280 to the moving frame half 282, actuate the selective pivotal movement of the moving frame half 282 relative to the main frame 280.

Multiple suction cups 302 are associated with a face 303 of the main frame 280 and, similarly, multiple suction cups 304 are associated with a face 305 of the moving frame half 282. Bulk head fittings 306 secure the multiple suction cups 304 to the moving frame half 282. Within the main frame 280, a paddle cylinder 308, straight fitting 310, and an elbow fitting 312 secure vacuum manifolds 314, 316 within the main frame 280 in pneumatic communication with the suction cups 302, 304. Vacuum sensors 318, 320 are mounted in the main frame 280 proximate to the suction cups 302. A visual detection subsystem 162 is housed in the main frame and includes a camera assembly 322, lighting assembly 324, and a camera mount 326.

Referring now to FIGS. 4A through 5C, in an unloading operation, the vacuum sensors 318, 320 senses for the presence of a box 46. In response to detecting an object, such as a box 46 having a top T, the vacuum sensors 318, 320 actuate the vacuum manifolds 314, 316 to generate a vacuum force to grip the object via the suction cups 302, 304. As shown in FIGS. 5A through 5C, the industrial robot 56 and gripper arm 134 may grip a box 46 in any one of three positions depending on the demands of the unloading or unpacking operation. A bottom-front grip (FIG. 5A), a top-front grip (FIG. 5B) or a top grip (FIG. 5C) may be used.

Figure 6A:
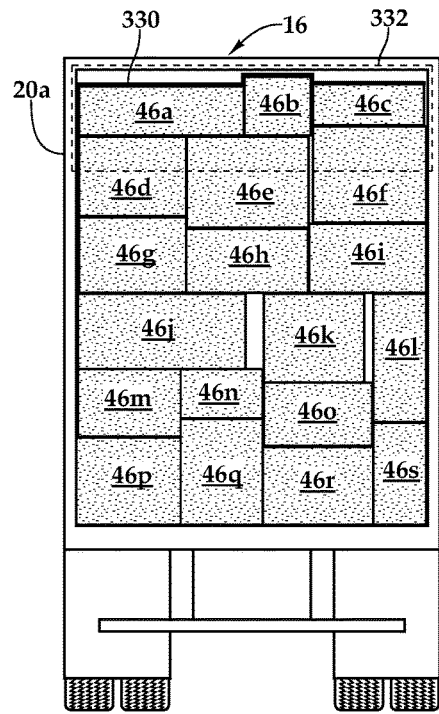
FIGS. 6A through 6D are schematic diagrams of one operational embodiment of the automatic truck unloader of FIG. 1 unpacking boxes in the trailer of the truck.

FIGS. 6A through 6D depict one operational embodiment of the automatic truck unloader 10 unloading or unpacking boxes 46A-46S in the trailer of the truck. Referring now to FIG. 6A, boxes 46A-46G are positioned in an empty trailer of the truck to be unloaded by the automatic truck unloader 10. More specifically, the distance measurement subassembly 170 continuously determines the position of the automatic truck unloader 10 within the trailer and the presence of objects, including boxes 46, is known. When beginning a removal operation, the automatic truck unloader 10 identifies a product space, e.g., space of boxes 46A through 46S, including a product skyline 330 and chooses an active quadrant 332 to begin unstacking operations. The active quadrant 332 is a subspace of the product space. Additionally, using the visual detection subsystem 162, a protruding object is identified and removed. In FIG. 6A, the removal is initiated by removing box 46B.

Figure 6B:
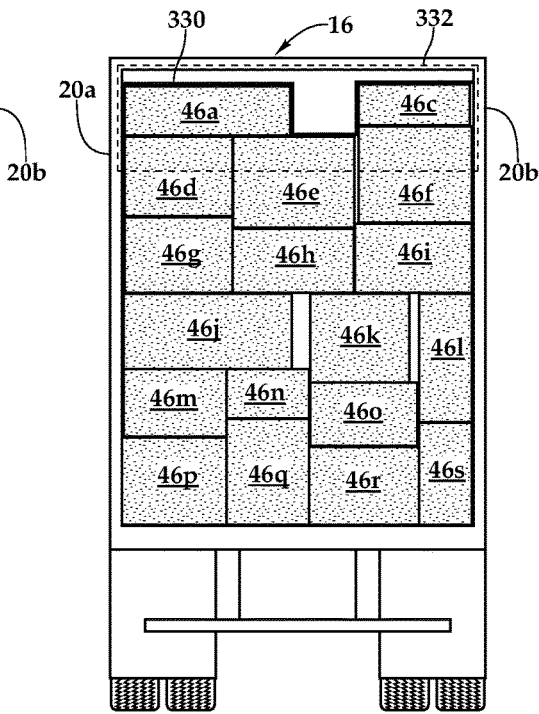
Figure 6C:
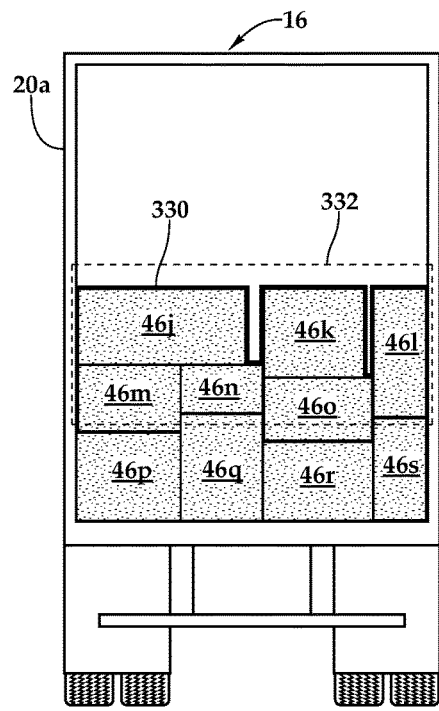
Figure 6D:
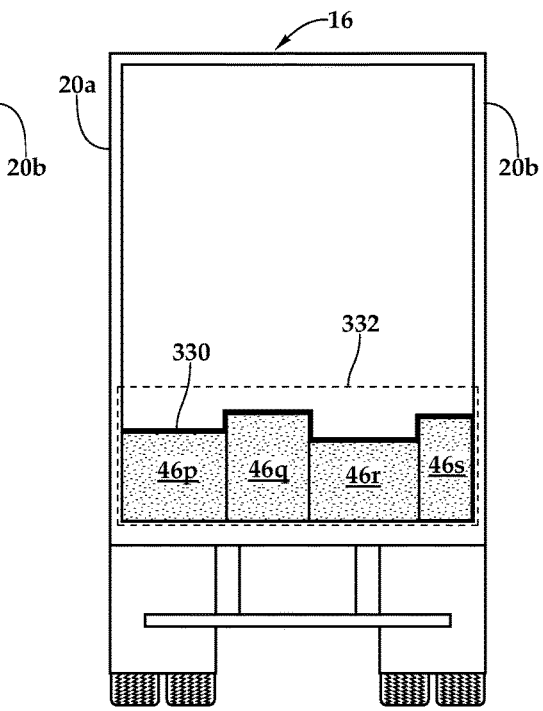

With reference to FIG. 6B, the unloading and unpacking continues in the active quadrant 332 at newly defined skyline 332 with the removal of box 46A, then 46C. As the product space diminishes, the active quadrant is readjusted and within each new skyline, the boxes are removed based on protrusion, which in one embodiment may be height. With reference to FIG. 6C, this methodology continues with the skyline 330 and activity in quadrant 332. In this active quadrant 332, box 46J, then 46K, then 46L are removed. The sequential removal of boxes continues until the trailer of the truck is almost empty as shown in FIG. 6D, with boxes 46P through 46S remaining to be removed.

FIGS. 7A through 7D, wherein one embodiment of an automated truck unloading system and methodology are illustrated for the automatic truck unloader 10 of the present invention. Initially, as shown in FIG. 7A, the trailer 16 is positioned under the power of the tractor trailer 12 at the loading bay 30 of the loading dock 32 approximate to the deck 38 where the automatic truck unloader 10 is working. The trailer 16 is reversed, set-up, and activated in a usual manner. The dock plate 36 is deployed from the loading bay 30 into the trailer 16 to provide a bridge. Thereafter, the trailer 16 is inspected for significant damage that may interfere with the automated loading operations of the automatic truck unloader 10. Additional inspection may include ensuring the trailer is reasonably centered within the loading bay 30 and ensuring the deck 38 is clear of any obstructions. At this time, by way of further safety measures, a kingpin lockout may be installed to prevent a driver from accidentally pulling out the trailer 16 from the loading bay 30 when the automatic truck unloader 10 is operating within the trailer 16. The kingpin lockout or similar safety precautions protect both the operator and the equipment and ensures that the wheels of the trailer 16 are chocked and will not roll during the use of the automatic truck unloader 10.

Continuing to refer to FIG. 7A, once the trailer 16 is positioned in the loading bay 30, the automatic truck unloader 10 is moved in front of the rear access opening 26 of the trailer 16. The automatic truck unloader 10 utilizes either a manual or automatic reverse mode to assist the operator (whether on the automatic truck unloader 10 or at a remote location) in backing the automatic truck unloader 10 up to the telescoping conveyer unit 42 in a position that is square thereto. The conveyance subassembly 54 of the automatic truck unloader 10 is then coupled to the telescoping conveyor unit 42. At this time, as the dock plate 36 has been positioned from the deck 38 to the trailer 16, the automatic truck unloader may be advanced into the interior of the trailer 16 proximate the row of boxes 344j, which forms one of the rows of boxes 344a through 344j with 344a being proximate to the front of the trailer 16 and 344j at the rear.

With reference to FIG. 7B, the automatic truck unloader 10 has advanced forward into the trailer 16 and, in one embodiment, the positioning subassembly 58 and, in particular, the distance measurement subassembly 170 continuously determines the position of the automatic truck unloader 10 within the trailer 16. More specifically, several measurements are made. The position and angle of the automatic truck unloader 10 are measured with respect to the sidewalls 20A, 20B and an interior width defined thereby. Also, measurements are made with respect to a near wall within the trailer 16 and the floor 22. The near wall being the closer of the front wall 18 of the trailer or the edge formed by product 46, e.g. cases, positioned within the trailer 16. The angle relative to the floor 22 proximate to the automatic truck unloader 10 is measured as the automatic truck unloader 10 traverses the dock plate 36 and moves into the trailer 16. In one embodiment, following successful traversal, the angle relative to the floor 22 may be assumed to be constant.

In this way, as the automatic truck unloader 10 moves, the position of the automatic truck unloader 10 relative to objects in its environment, including boxes, is known and the automatic truck unloader 10 may adjust operation appropriately. Adjustments in operation may include, but are not limited to, the operation of the industrial robot 56, the operation of the conveyance subassembly 54, and the actuation of the drive subassembly 52. The position of the sidewalls 20A, 20B and the near wall is utilized to determine the position of the automatic truck unloader 10 along the length of the trailer 16, the position across the width of the trailer 16, and the automatic case loader's angle relative to the sidewalls 20A, 20B or yaw. The measurements also determine the position of the automatic truck unloader 10 relative to the floor 22 of the trailer 16. To assist the automatic truck unloader 10 in determining position within the trailer 16, in one implementation, the automatic truck unloader 10 is programmed with the dimensions of the trailer 16.

Additionally, in one embodiment, the automatic truck unloader 10 is programmed with the reachable space 132 of the industrial robot 56. As illustrated, once the automatic truck unloader is positioned proximate to the row of boxes 344j such that the removal of boxes 46 within the trailer 16 may begin and the boxes 46 are within the reachable space 132 of the industrial robot 56, the automatic truck unloader 10 stops advancing. Continuing to refer to FIG. 7B, boxes 46 are conveyed to the telescoping conveyer unit 42 form the conveyance subassembly 54 and this stream of boxes 46 is presented by the industrial robot 56 during the unloading/unpacking operation. With selective articulated movement through the reachable space 132, the industrial robot 56 removes the boxes 46 from the trailer and sequentially selects the box to be removed based on how far particular boxes in an active quadrant protrude.

As depicted in FIG. 7C, the automatic truck unloader 10 has completed unloading multiple horizontal rows 344B-344J of boxes 46. During the unloading operation, the unloading of the boxes 46 by the industrial robot 56 is temporarily interrupted in response to the distance measurement subassembly 170 detecting the absence of the boxes 46 within the reachable space 132. Further, with this information being available to the control subassembly 62, a signal may be sent to the conveyance subassembly 54 to slow down or temporarily halt the powered transport of the product 46.

As a result of the completion of the removal of boxes in a row, such as rows 344B-344J, the automatic truck unloader 10 periodically drives forward and repositions to refresh the reachable space 132 such that the automatic truck unloader 10 is positioned proximate to the wall of placed boxes 46, e.g., the product space, in order that the removal of additional boxes 46 against the wall of placed boxes 46 is within the reachable space 132 of the industrial robot 56. During the repositioning of the automatic truck unloader 10, the telescoping conveyor unit appropriately advances, while maintaining contact with the conveyance subassembly 54, to accommodate the new position of the automatic case loader/unloader 10.

Referring to FIG. 7D, the iterative unstacking operations and repositioning of the automatic truck unloader 10 described in FIGS. 7A through 7C continues and the trailer 16 is empty. With respect to FIG. 8D, the trailer 16 is completely empty with boxes 46, including rows 344A-344J being removed, and the automatic truck unloader 10 is reversed to a position entirely on the deck 38. Thereafter, the trailer 16 emptied of boxes may leave the loading dock 32 and a fresh full trailer may then be positioned at the loading bay 30 and unloaded in the manner described herein.

Figure 8:
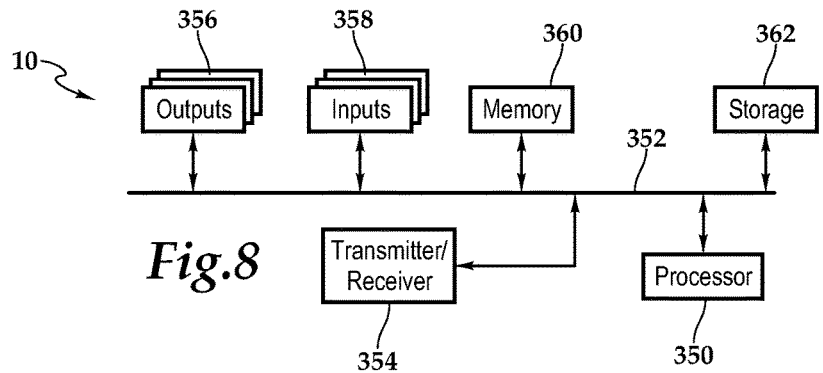
FIG. 8 is a schematic block diagram of one embodiment of the automatic case loader.

FIG. 8 depicts one embodiment of the automatic truck unloader 10 in which the automatic truck unloader 10 is schematically depicted to include a computer-based architecture including a processor 350 coupled to a bus 352 having transmitter/receiver circuitry 354, outputs 356, inputs 358, memory 360, and storage 362 interconnected therewith. In one embodiment, the control assembly 192 includes the memory 360, which is accessible to the processor 350. The memory 360 includes processor-executable instructions that, when executed cause the processor 350 to execute instructions for unpacking or unloading boxes 46 or other objects. By way of example and not by way of limitation, the instructions may be directed specifying a search operation to identify a product skyline within a product space. Then, a search operation may be specified to identify an active quadrant within the product space and a search operation may be specified to identify a protruding product within the active quadrant at the product skyline. Upon the identification of the protruding product, a removal operation may be specified to unload the product corresponding to the protruding product and instructions calculated for removing the product corresponding to the protruding product. These instructions may iteratively continue.

Figure 9:
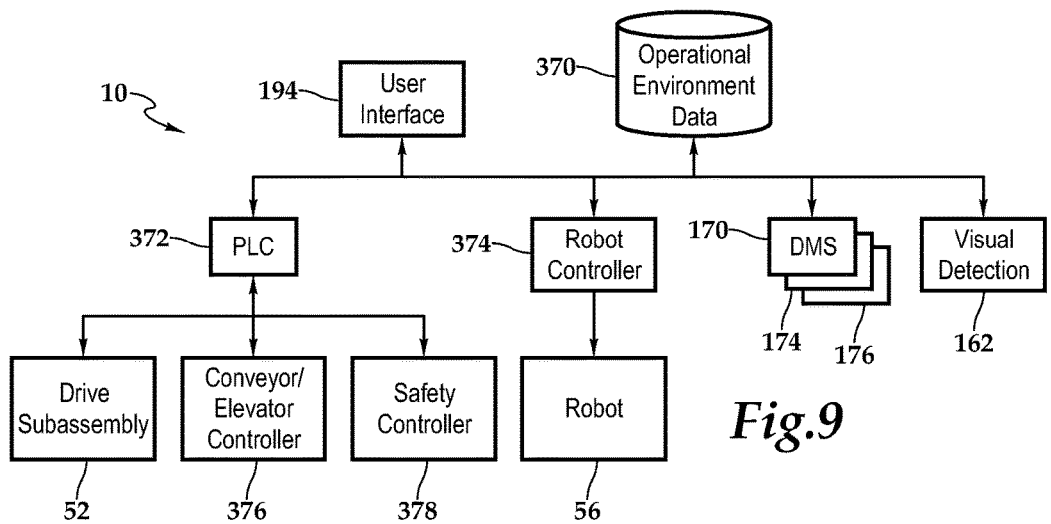
FIG. 9 is a schematic block diagram of one embodiment of the automatic case loader in additional detail.

FIG. 9 depicts one embodiment of the automatic truck unloader 10 and the control signals associated therewith, which may be deployed across the computer architecture shown in FIG. 9, for example. The illustrated components coordinate the various functions and operations of the automatic truck unloader 10. The user interface 194, operational environment database 370, programmable logic controller 372, robot controller 374, and distance measurement subassemblies 170, 174, 176 are interconnected. The drive subassembly 52, conveyance subassembly 54, as represented by control 376 for conveyors/elevators, and safety controller 378 are connected to the programmable logic controller 372. Finally, the industrial robot 56 is connected to the robot controller 374. In one implementation, the user interface 194, operational environment database 370, and programmable logic controller 372 are part of the control subassembly 62 and the robot controller 374 forms a portion of the industrial robot 56. The safety controller 358 is included in the safety subsystem 60 and provides operation to the aforementioned components of this subsystem.

The user interface 194 provides user control and interaction with the automatic truck unloader 10. The user interface 194 may utilize icons in conjunction with labels and/or text to provide navigation and a full representation of the information and actions available to the operator. In addition to loading operations, user interactions may be related to maintenance, repair and other routine actions which keep the automatic truck unloader 10 in working order or prevent trouble from arising.

The operational data environment database 370 includes data about the reachable space 132 of the industrial robot 56, stacking methodology data, product information as well as information about the standard sizes of trailers. The product information may be stored in the operational data environment database 350, gathered by the conveyance subassembly 54 as previously discussed, or gained by a combination thereof. By having the standard sizes of trailers pre-loaded, operator time is saved from having to enter this data and performance of the automatic truck unloader 10 is improved with this additional information. By way of example, Tables I & II present exemplary examples of type of trailer data that the automatic ruck unloader 10 may utilize in determining position and product placement.

TABLE I

TRAILER DIMENSIONS

| Trailer Type | Length | Inside Width | Inside Height Center | Inside Height Front | Door Opening Width |
|---|---|---|---|---|---|
| 28' (8.5 m) High Cube | 27'3" (8.3 m) | 100" (2.5 m) | 109" (2.8 m) | 107" (2.7 m) | 93" (2.4 m) |
| 45' (13.7 m) Wedge | 44' 1½" (13.4 m) | 93" (2.4 m) | 109" (2.8 m) | 106" (2.7 m) | 87" (2 m) |
| 48' (14.6 m) Wedge | 47'3" (14.4 m) | 99" (2.5 m) | 110½" (2.8 m) | 108½" (2.8 m) | 93" (2.4 m) |

TABLE II

TRAILER DIMENSIONS CONTINUED

| Trailer Type | Door Opening Height | Rear Floor Height | Cubic Capacity | Overall Width | Overall Height |
|---|---|---|---|---|---|
| 28' (8.5 m) High Cube | 104" (2.6 m) | 47½" (1.2 m) | 2029 cft (57.5 cm) | 102" (2.6 m) | 13'6" (4.1 m) |
| 45' (13.7 m) Wedge | 105½" (2.7 m) | 50" (1.3 m) | 3083 cft (7.3 cm) | 96" (2.4 m) | 13'6" (4.1 m) |
| 48' (14.6 m) Wedge | 105" (2.7 m) | 48½" (1.2 m) | 3566 cft (101 cm) | 102" (2.6 m) | 13'6" (4.1 m) |

The programmable logic controller 372 coordinates overall operation and switches between various modes of operation including manual and automatic. The programmable logic controller 372 also provides for the high-level calculation and coordination required during automatic operation for items such as the current unload quadrant unloading and steering angel calculations during automatic navigation.

The robot controller 374 controls the motions of the industrial robot 56 through built in inputs and outputs wired through the industrial robot 56 and the end effector 130. It should be appreciated that although a particular architecture is presented for the control of the automatic case loader, other architectures are within the teachings of the present invention. By way of example, any combination of hardware, software, and firmware may be employed. By way of further example, the distribution of control may differ from that presented herein.

In one operation embodiment, the programmable logic controller 372 accesses the dimensions of the trailer from the operational environment database 372. The operator 40 has indicated through the user interface 194 which type of trailer has arrived at the docking bay 30. Alternatively, the distance measurement subassembly 170 is operable to detect this information. The distance measurement subassemblies 170, 174, 176 relay distance and position data to the programmable logic controller 352 which uses this information to send control signals to the robot controller 374, the drive subassembly 52, the controller 372, and the safety controller 378. Additionally, the programmable logic controller 372 receives control signals, which are inputs into the behavior process, from each of these components. Constant updates and status information are provided to the operator by the programmable logic controller 352 through the user interface 194.

Figure 10:
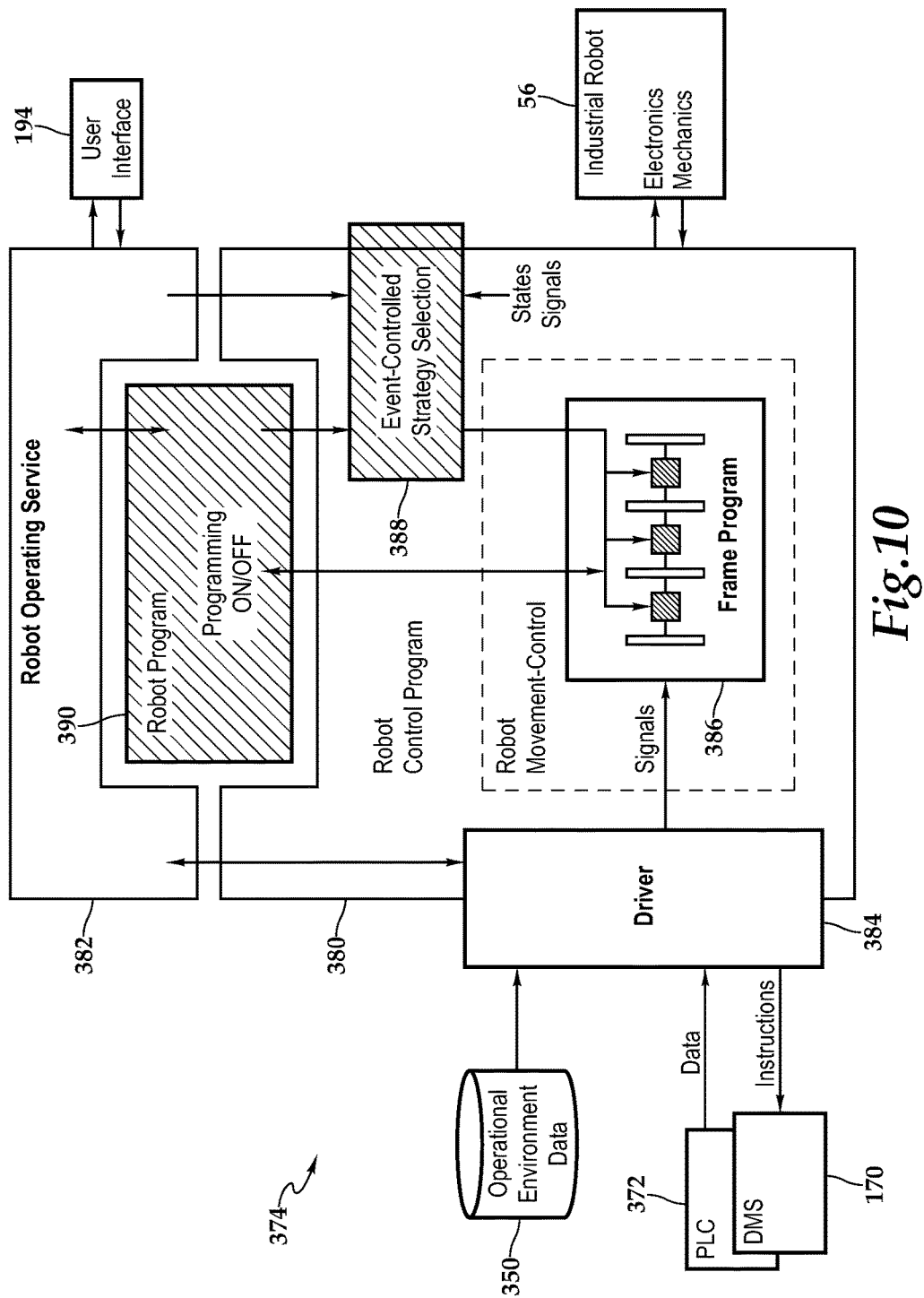
FIG. 10 is a schematic diagram of one embodiment of a robot controller which forms a portion of the automatic case loader.

FIG. 10 depicts one embodiment of the robot controller 372 which forms a portion of the automatic truck unloader 10. The essence of the robot control 372 is a robot system or control program 380, which controls the industrial robot 56. The control program 380 can be operated by the operator 40 by means of an operating service 362 in communication with the user interface 194 and receives input data (as well as provide instructions, as appropriate) from the operational environmental database 370, programmable logic controller 372, and distance measurement subassembly 170 by means of a driver 384. It should be appreciated, that the independence of the robot controller 374 may vary. In one implementation, the robot controller 374 may be under the control of the programmable logic controller 374. In another implementation, as illustrated, the robot controller 374 is more autonomous and may include features such as direct connection to the user interface 194.

According to one embodiment, between the driver 384 and the control program 380 is provided an independent data processing layer in the form of a frame program 386, which controls the robot movements, and a unit 388 for automated or event-controlled strategy or behavioral selection on the basis of the states and signals which occur. User application programs, event-controlled strategy selections and sensor programs in the frame program 386 can be programmed by the operator 40 and directed by a robot program 390, which monitors the balance and implementation of manual and automatic control of the industrial robot 56.

Figure 11:
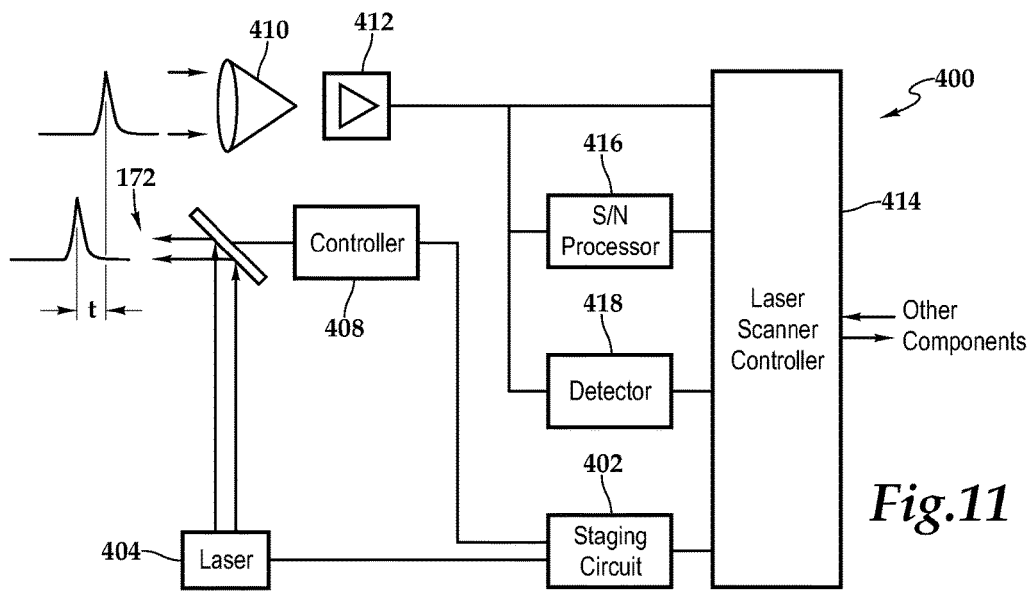
FIG. 11 is a schematic diagram of one embodiment of a distance measurement subassembly which forms a component of the automatic case loader.

FIG. 11 depicts one embodiment of a distance measurement subassembly, i.e., a laser measurement sensor 400. A staging circuit 402 causes a pulsed laser 404 to transmit light pulses while causing the rotation of a light deflecting device 406 via controller 408 which may be equipped with a rotational means and a motor. The angular position of the light deflecting device 406 is continuously communicated to the staging circuit 402 by the controller 408. Light pulses are transmitted into the detection space 172 via the transmitter lens and the mirrors associated with the light deflection device 406. More particularly, when the rotary mirror of the light deflection device 406 is driven by the controller 408 to execute a continuous rotary movement, the staging circuit 402 causes the pulsed laser 404 to transmit a light pulse. The light pulse is transmitted into the detection space 172 and is reflected from an object, so that finely a received pulse enters into a photo receiving arrangement 410. In this manner the light reaches the photo receiver arrangement 410 after a light transit time t of 2d/c, where d is the space in the object from the apparatus and c is the speed of light.

The time t between the transmission and reception of the light pulse is measured with the aid of a comparator 412 having time interval computer functionality. On transmitting the light pulse, a counter function within the comparator 412 is triggered and is stopped again by the photo receiver arrangement 410 via the comparator 412 on receiving the light pulse from the detection space 172.

A corresponding electrical signal is formed and applied via comparator 412 to a laser scanner controller 414, signal to noise processor 416 and a detector 418, which analyzes the signal for objects and in the instant example determines that an object is present. The task of the signal to noise processor 416 is to control the detection threshold independence on the received noise level. This control ensures a constant false alarm rate with varying illumination situations and object reflection factors. The signal to noise processor 416 makes available this information to the laser scanner controller 414. The laser scanner controller 414 performs peak value calculations based on the data from the comparator 412, the signal to noise processor 416, and the detector 418.

As the laser scanner controller 414 knows the instantaneous angular position of the light pulses by way of communication with the staging circuit 402, the laser scanner controller 414 determines the location of the object and other navigational properties. The laser scanner controller 414 is adapted to forward this information to other components.

Figure 12:
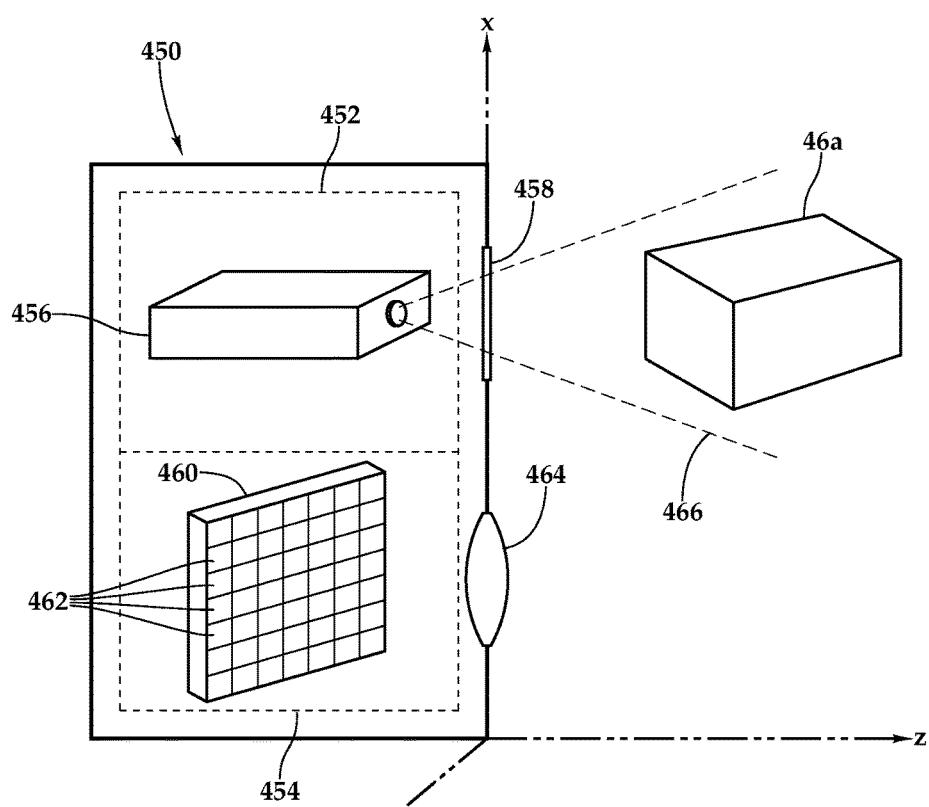
FIG. 12 is a schematic diagram of another embodiment of a distance measurement subassembly which forms a component of the automatic tire loader.

FIG. 12 is a schematic diagram of a distance measurement subassembly 170, which is depicted as a three dimensional (3-D) measurement system 450, which includes an illumination assembly 452 and an image capture subassembly 454 that together utilize a laser and/or infrared-based camera application employing an adaptive depth principle. The illumination assembly 452 includes a light source 456 and a transparency 458, which may include a positive image on a transparent support with a various sorts of fixed, uncorrelated patterns of spots, for example.

The light source 456 transilluminates transparency 458 with optical radiation so as to project an image of the spot pattern that is contained by the transparency onto object 46A, which is depicted as a product, but may also include various environmental information about the storage container. The image capture assembly 454 captures an image of the pattern that is projected by illumination assembly 452 onto the product 46A. The image capture assembly 454 may include objective optics 464, which focus the image onto an image sensor 460. Typically, the image sensor 460 includes a rectilinear array of detector elements 462, such as a CCD or CMOS-based image sensor array.

As should be appreciated, although the illumination assembly and image capture assembly are shown as held in a fixed spatial relation, various other positioning techniques may be employed to create a dynamic relationship therebetween. Moreover, the three-dimensional x, y, z axis may be employed in this regard. To generate a 3D map of object or product 46A, including the environment, a processor, which may incorporated into processor 350 or associated therewith, compares the group of spots in each area of the captured image to the reference image in order to find the most closely-matching group of spots in the reference image. The relative shift between the matching groups of spots in the image gives the appropriate x, y or Z-direction shift of the area of the captured image relative to the reference image. The shift in the spot pattern may be measured using image correlation or other image matching computation methods that are known in the art. By way of example, the operation principle may include an infrared adaptive depth principle utilizing laser or infrared cameras.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An automatic truck unloader for unloading/unpacking product from a trailer, the automatic truck unloader comprising:
    a base structure having first and second ends;
    an industrial robot disposed at the second end of the base structure, the industrial robot providing selective articulated movement of an end effector between the powered transportation path and a reachable space such that the industrial robot is operable to handle the product in the reachable space;
    a distance measurement subassembly disposed at the second end, the distance measurement subassembly configured to determine presence of objects within a detection space, wherein the detection space and the reachable space at least partially overlap;
    a control subassembly mounted to the base structure, the control subassembly being in communication with the industrial robot, and the distance measurement subassembly, the control subassembly coordinating the selective articulated movement of the industrial robot and the activation of the drive subassembly based upon the distance measurement subassembly detecting objects within the detection space, and dimensions of the trailer provided to the control subassembly; and
    the control assembly including a memory accessible to a processor, the memory including processor-executable instructions that, when executed cause the processor to:
        specify a search operation to identify a product skyline within a product space,
        specify a search operation to identify an active quadrant within the product space, specify a search operation to identify a protruding product within the active quadrant at the product skyline,
specify a removal operation to unload the product corresponding to the protruding product, and
calculate instructions for removing the product corresponding to the protruding product.

2. The automatic truck unloader as recited in claim 1, wherein the end effector further comprises a suction cup-based gripper arm.

3. The automatic truck unloader as recited in claim 1, wherein the end effector further comprises a suction cup-based gripper arm adapted for manipulating a box with cooperating grapplers that grip the box in a gripping position selected from the group consisting of parallel to the box and perpendicular to the box.

4. The automatic truck unloader as recited in claim 1, wherein the end effector further comprises:
a main frame having a support frame for attachment to the industrial robot;
a moving frame half selectively pivotally coupled to the main frame by a joint to provide a range of motion between approximately a parallel presentation between the main frame and the moving frame and approximately an orthogonal presentation between the main frame and the moving frame;
a first plurality of suction cups associated with a face of the main frame;
a second plurality of suction cups associated with a face of the main frame;
a vacuum manifold housed within the main frame in pneumatic communication with the first and second pluralities of suction cups;
a vacuum sensor mounted in the main frame proximate to the first plurality of suction cups, the vacuum sensor, in response to detecting an object, being configured to actuate the vacuum manifold and generate a vacuum force to grip the object; and
a visual detection subsystem housed in the main frame, the visual detection subsystem being configured to capture an image of the product space for processing by the control subassembly.

5. The automatic truck unloader as recited in claim 1, further comprising a visual detection subsystem associated with the end effector, the visual detection subsystem being configured to capture an image of the product space for processing by the control subassembly.

6. The automatic truck unloader as recited in claim 5, wherein the visual detection subsystem further comprises a camera and lighting assembly for digitally imaging the product space.

7. The automatic truck unloader as recited in claim 1, wherein the product space is a subspace of the detection space.

8. The automatic truck unloader as recited in claim 1, wherein the active quadrant is a subspace of the product space.

9. The automatic truck unloader as recited in claim 1, further comprising a drive subassembly coupled to the base structure, the drive subassembly including a plurality of wheels having a pair of front drive wheels disposed proximate to the second end, the pair of front drive wheels being powered by respective AC motors with double reduction gearboxes.

10. The automatic truck unloader as recited in claim 1, wherein the base structure further comprises a mobile base structure.

11. The automatic truck unloader as recited in claim 1, a conveyance subassembly disposed on the mobile base structure, the conveyance subassembly including a powered transportation path operable for transporting product between the first end and the second end.

12. The automatic truck unloader as recited in claim 11, wherein the conveyance subassembly further comprises a conveyor having a telescoping conveyor interface for coupling the automatic case loader to a telescoping conveyor unit.

13. The automatic truck unloader as recited in claim 1, wherein the distance measurement subassembly comprises a three-dimensional measurement system operating on an adaptive depth measurement principle.

14. The automatic truck unloader as recited in claim 1, wherein the distance measurement subassembly comprises a device selected from the group consisting of laser range finding apparatuses, cameras, ultrasonic measurement apparatuses, inclinometers, and combinations thereof.

15. The automatic truck unloader as recited in claim 1, wherein the dimensions of the trailer are programmed into the control subassembly.

16. An automatic truck unloader for unloading/unpacking product from a trailer, the automatic truck unloader comprising:
a base structure having first and second ends;
an industrial robot disposed at the second end of the base structure, the industrial robot providing selective articulated movement of an end effector between the powered transportation path and a reachable space such that the industrial robot is operable to handle the product in the reachable space;
the end effector including a suction cup-based gripper arm adapted for manipulating a box with cooperating grapplers that grip the box in a gripping position selected from the group consisting of parallel to the box and perpendicular to the box;
means for determining presence of objects within a detection space, wherein the detection space and the reachable space at least partially overlap;
a control subassembly mounted to the base structure, the control subassembly being in communication with the industrial robot, and the distance measurement subassembly, the control subassembly coordinating the selective articulated movement of the industrial robot and the activation of the drive subassembly based upon the distance measurement subassembly detecting objects within the detection space, and dimensions of the trailer provided to the control subassembly; and
the control assembly including a memory accessible to a processor, the memory including processor-executable instructions that, when executed cause the processor to:
specify a search operation to identify a product skyline within a product space,
specify a search operation to identify an active quadrant within the product space,
specify a search operation to identify a protruding product within the active quadrant at the product skyline,
specify a removal operation to unload the product corresponding to the protruding product, and
calculate instructions for removing the product corresponding to the protruding product.

17. The automatic truck unloader as recited in claim 16, further comprising a visual detection subsystem associated with the end effector, the visual detection subsystem being configured to capture an image of the product space for processing by the control subassembly.

18. An automatic truck unloader for unloading/unpacking product from a trailer, the automatic truck unloader comprising:
- a base structure having first and second ends;
- an industrial robot disposed at the second end of the base structure, the industrial robot providing selective articulated movement of an end effector between the powered transportation path and a reachable space such that the industrial robot is operable to handle the product in the reachable space;
- the end effector including a main frame having a support frame for attachment to the industrial robot;
- a moving frame half selectively pivotally coupled to the main frame by a joint to provide a range of motion between approximately a parallel presentation between the main frame and the moving frame and approximately an orthogonal presentation between the main frame and the moving frame;
- a first plurality of suction cups associated with a face of the main frame;
- a second plurality of suction cups associated with a face of the main frame;
- a vacuum manifold housed within the main frame in pneumatic communication with the first and second pluralities of suction cups;
- a vacuum sensor mounted in the main frame proximate to the first plurality of suction cups, the vacuum sensor, in response to detecting an object, being configured to actuate the vacuum manifold and generate a vacuum force to grip the object;
- a visual detection subsystem housed in the main frame, the visual detection subsystem being configured to capture an image of the product space for processing by a control subassembly;
- a distance measurement subassembly disposed at the second end, the distance measurement subassembly configured to determine presence of objects within a detection space, wherein the detection space and the reachable space at least partially overlap;
- the control subassembly mounted to the base structure, the control subassembly being in communication with the industrial robot, and the distance measurement subassembly, the control subassembly coordinating the selective articulated movement of the industrial robot and the activation of the drive subassembly based upon the distance measurement subassembly detecting objects within the detection space, and dimensions of the trailer provided to the control subassembly; and
- the control assembly including a memory accessible to a processor, the memory including processor-executable instructions that, when executed cause the processor to:
  - specify a search operation to identify a product skyline within a product space,
  - specify a search operation to identify an active quadrant within the product space,
  - specify a search operation to identify a protruding product within the active quadrant at the product skyline,
  - specify a removal operation to unload the product corresponding to the protruding product, and
  - calculate instructions for removing the product corresponding to the protruding product.

19. The automatic truck unloader as recited in claim 18, further comprising a visual detection subsystem associated with the end effector, the visual detection subsystem being configured to capture an image of the product space for processing by the control subassembly.

* * * * *